(12) United States Patent
Kanno

(10) Patent No.: US 6,672,283 B2
(45) Date of Patent: Jan. 6, 2004

(54) FOUR-CYCLE ENGINE FOR MARINE DRIVE

(75) Inventor: Isao Kanno, Shizuoka (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 363 days.

(21) Appl. No.: 09/878,323

(22) Filed: Jun. 11, 2001

(65) Prior Publication Data

US 2002/0017277 A1 Feb. 14, 2002

(30) Foreign Application Priority Data

| Jun. 9, 2000 | (JP) | 2000-173894 |
| Jun. 9, 2000 | (JP) | 2000-173903 |
| Jun. 9, 2000 | (JP) | 2000-173928 |

(51) Int. Cl.$^7$ .................................................. F02P 5/00
(52) U.S. Cl. ........................... 123/406.59; 123/406.59; 123/90.5
(58) Field of Search ................... 123/406.58, 406.59, 123/406.61, 90.5

(56) References Cited

U.S. PATENT DOCUMENTS

| 5,012,773 A | 5/1991 | Akasaka et al. |
| 5,058,539 A | 10/1991 | Saito et al. |
| 5,111,780 A | 5/1992 | Hannibal |
| 5,133,310 A | 7/1992 | Hitomi et al. |
| 5,143,034 A | 9/1992 | Hirose |
| 5,150,675 A | 9/1992 | Murata |
| 5,184,578 A | 2/1993 | Quinn, Jr. et al. |
| 5,184,581 A | 2/1993 | Aoyama et al. |
| 5,189,999 A | 3/1993 | Thoma |
| 5,289,805 A | 3/1994 | Quinn, Jr. et al. |
| 5,301,639 A | 4/1994 | Satou |
| 5,305,718 A | 4/1994 | Muller |
| 5,353,755 A | 10/1994 | Matsuo et al. |

(List continued on next page.)

FOREIGN PATENT DOCUMENTS

| EP | 0 356 162 A1 | 8/1989 |
| EP | 0 699 831 A2 | 8/1995 |
| EP | 0 808 997 A1 | 5/1997 |
| EP | 0 829 621 A2 | 9/1997 |

*Primary Examiner*—Bibhu Mohanty
(74) *Attorney, Agent, or Firm*—Knobbe, Martens, Olson & Bear LLP

(57) ABSTRACT

A four-cycle engine for a marine drive has an air induction device introducing air to a combustion chamber. The air induction device defines an intake port next to the combustion chamber. An intake valve is movable between open and closed positions of the intake port. A valve actuator is journaled on the engine body for rotation to actuate the intake valve at a set angular position. A setting mechanism is arranged to set the valve actuator to the angular position between advanced and delayed angular positions. A sensor is arranged to sense an amount of the air within the induction device. A control system is configured to control the setting mechanism based upon the signal of the sensor. The control system controls the setting mechanism to set the valve actuator to an angular position that is closer to the first angular position than a present angular position when the signal indicates that the amount of the air increases and a change rate of the amount is greater than a preset change rate.

38 Claims, 14 Drawing Sheets

U.S. PATENT DOCUMENTS

| | | |
|---|---|---|
| 5,458,099 A | 10/1995 | Koller et al. |
| 5,460,130 A | 10/1995 | Fukuzawa et al. |
| 5,474,038 A | 12/1995 | Golovatai-Schmidt et al. |
| 5,540,197 A | 7/1996 | Golovatai-Schmidt et al. |
| 5,592,907 A | 1/1997 | Hasebe et al. |
| 5,606,941 A | 3/1997 | Trzmiel et al. |
| 5,669,343 A | 9/1997 | Adachi |
| 5,704,315 A | 1/1998 | Tsuchida et al. |
| 5,713,319 A | 2/1998 | Tortul |
| 5,718,196 A | 2/1998 | Uchiyama et al. |
| 5,722,356 A | 3/1998 | Hara |
| 5,758,612 A | 6/1998 | Tsuzuku et al. |
| 5,797,363 A | 8/1998 | Nakamura |
| 5,799,631 A | 9/1998 | Nakamura |
| 5,813,377 A | 9/1998 | Matsunaga |
| 5,816,204 A | 10/1998 | Moriya et al. |
| 5,826,560 A | 10/1998 | Ito |
| 5,829,399 A | 11/1998 | Scheidt et al. |
| 5,836,274 A | 11/1998 | Saito et al. |
| 5,855,190 A | 1/1999 | Matsunaga |
| 5,913,298 A | 6/1999 | Yoshikawa |
| 5,954,019 A | 9/1999 | Yoshikawa et al. |
| 6,032,629 A | 3/2000 | Uchida |
| 6,035,817 A | 3/2000 | Uchida |
| 6,076,492 A | 6/2000 | Takahashi |
| 6,129,060 A | 10/2000 | Koda |
| 6,186,104 B1 | 2/2001 | Torii et al. |

FOUR-CYCLE ENGINE FOR MARINE DRIVE

PRIORITY INFORMATION

This application is based on and claims priority to Japanese Patent Applications No.2000-173894, filed Jun. 9, 2000, No.2000-173903, filed Jun. 9, 2000, and No.2000-173928, filed Jun. 9, 2000, the entire contents of which are hereby expressly incorporated by reference.

BACKGROUND OF THE INVENTION

1. Field of the Invention

The present invention relates to a four-cycle engine for a marine drive, and more particularly relates to a four-cycle engine for a marine drive that includes a variable valve timing mechanism.

2. Description of Related Art

A typical outboard motor comprises a power head and a housing unit depending from the power head. The power head includes an internal combustion engine that drives a marine propulsion device such as a propeller with a driveshaft and a propulsion shaft that both are journaled within the housing unit. The marine propulsion device is attached to the end of the propulsion shaft extending out of the housing unit and is placed in a submerged position.

Recently, many outboard motors are powered by a four-cycle internal combustion engine because of the better emission control capability of four-cycle technology when compared to two-stroke technology. Generally, a four-cycle engine includes at least one intake port and at least one exhaust port that are in communication with a combustion chamber. One or more camshafts can be provided to actuate valves associated with the ports such that flow can be controlled through the ports. The valve movement is timed so that air can be introduced into the combustion chamber, compressed in the combustion chamber, combusted in the combustion chamber and the resulting exhaust gases then can be discharged from the combustion chamber.

Typical automobile engines include a variable valve timing mechanism that can advantageously change the timing of the opening and closing of the valves. Such variable valve timing mechanisms can adjust the timing of the valves such that a first valve timing is used at higher engine speeds and a second valve timing is used as low engine speeds. The valve timing usually is advanced in the high engine speed range to ensure high charging efficiency and high performance. Similarly, the valve timing can be delayed in the low engine speed to ensure high combustion efficiency, fuel economy and good emission control. Thus, generally speaking, the valve timing is adjusted to either an advanced first valve timing for higher engine speed ranges or a delayed second valve timing lower engine speed ranges.

Typically, adjusting the valve timing and configuring at least the intake system result in higher performance only in a particular desired power range. Because of this design characteristic, engine torque in a range of low and medium engine speed is likely to be neglected in favor of optimizing performance in a higher engine speed range.

While adjusting the valve timing of an automotive engine in this manner can satisfactorily improve the performance of the engine in a desired power range, such a technique does not readily transfer to marine applications. A marine drive, such as a propeller, accelerates quickly to a high speed rotation because of the low viscosity of water. Thus, a relatively large engine torque generally is necessary in the low and medium engine speed ranges. For instance, the sudden acceleration of a propeller from a slower rotation, or a standstill, to a suitable operating speed requires a very large engine torque.

A need therefore exists for an improved four-cycle engine for a marine drive that can generate relatively large torques while accelerating in low and medium engine speed ranges.

Another problem (i.e., over-revolution of the engine or "redlining the engine") may arise also with marine drives. Automobile engines usually cut the supply of fuel (i.e., interrupted fuel injection, for instance) when the engine is revved to a high enough speed. By cutting the fuel, then engine returns to a suitable rotational speed or a normal operating condition. This method of engine speed control, however, generally is not suitable for marine drives due to the relatively high loads incurred while the watercraft is moving. In other words, reducing the amount of fuel in the air-fuel mixture still allows a low energy power stroke, which can cause swings in the engine speed. If the fuel-cut method were used, the engine speed might abruptly lower such that relatively large fluctuations in the engine speed would result during the over-rev control.

Outboard engines, thus, generally employ another method in which ignitions are cut if the over-revving occurs. While the method is effective against over-rev situations, unburned fuel can be discharged to the atmosphere when the ignition is cut. If the engine includes a catalyst within the associated exhaust system, the unburned fuel can foul the catalyst under extreme conditions.

Another need thus exists for an improved four-cycle engine for a marine drive that can prevent over-revving from occurring without causing major fluctuations in engine speed.

Some engines for marine drives also employ an idle air delivery device that bypasses a throttle valve in a main intake passage. An idle valve is provided within the delivery device to measure an amount of idle air passing therethrough. Changing a position of the idle valve can control the idle speed of the associated motor. Although idle air is delivered to the combustion chamber through the idle air delivery device, the throttle valve desirably is slightly opened to allow a light air flow through the main intake passage such that the idle speed can be substantially stabilized. The light flow of air also works to prevent sticking of the throttle valve when higher engine speed operation is desired.

Under certain circumstances, the idle speed may unexpectedly and unintentionally increase. More specifically, because the poorly regulated light flow of air through the main intake passage, air amounts delivered to the combustion chamber during idle can vary such that idle speed can exceed a desired objective idle speed. In some applications, delaying ignition timing can reduce the effects of this problem. This solution, however, may decrease fuel economy as well.

Hence, a further need exists for an improved four-cycle engine for a marine drive that can substantially maintain an actual idle speed at an objective idle speed without unwarranted decreases in fuel economy.

SUMMARY OF THE INVENTION

In accordance with one aspect of the present invention, an internal combustion engine for a marine drive comprises an engine body and a member movable relative to the engine body. The engine body and the member together define a variable-volume combustion chamber. An air induction device is arranged to introduce air to the combustion chamber with the air induction device comprising an intake port that provides a connection between the air induction device and the combustion chamber. An intake valve is movable relative to the intake port between an open position and closed position such that the intake valve can selectively inhibit air flow into the combustion chamber. A valve actuator is rotatably journaled relative to the engine body. The valve actuator moves the intake valve at a preset angular position of the valve actuator. A valve actuator driving arrangement is adjustably connected to the valve actuator such that the preset angular position can be advanced or delayed through movement relative to the valve actuator driving arrangement. A setting mechanism is interposed between the valve actuator driving arrangement and the valve actuator. The setting mechanism is arranged to adjust the preset angular position of the valve actuator relative to the valve actuator driving arrangement. The setting mechanism is capable of adjusting the valve actuator between a first limit angular position and a second limit angular position with the first limit angular position being advanced relative to the second limit angular position. A sensor is arranged to sense an amount of the air within the induction device and a control system is adapted to control the setting mechanism based upon the signal of the sensor. The control system is adapted to control the setting mechanism to set the valve actuator to an adjusted angular position that is advanced relative to a current angular position when the signal indicates that the amount of the air increases and a change rate of the amount is greater than a preset change rate.

In accordance with another aspect of the present invention, an internal combustion engine for a marine drive comprises an engine body and a movable member movable relative to the engine body. An output shaft is rotatably driven by the movable member. The engine body and the movable member together define a combustion chamber. An air induction device is arranged to introduce air to the combustion chamber and the air induction device comprises an intake port communicating with the combustion chamber. An intake valve is adapted to selectively open and close the intake port. A valve actuator is journaled on the engine body for rotation to actuate the intake valve at a first angular position. A setting mechanism is arranged to adjust the valve actuator to an angular position between a first limit angular position and a second limit angular position with the first limit angular position being advanced relative to the second limit angular position. A sensor is arranged to sense a rotational speed of the output shaft and a control system is configured to control the setting mechanism based upon the signal of the sensor. The control system controls the setting mechanism to set the valve actuator to an angular position that is different from a present angular position when the signal of the second sensor indicates that the rotational speed of the output shaft is greater than a first preset speed.

In accordance with a further aspect of the present invention, an internal combustion engine for a marine drive comprises an engine body and a movable member movable relative to the engine body. An output shaft is driven for rotation by the movable member. The engine body and the movable member together define a combustion chamber. An air induction device is arranged to introduce air to the combustion chamber. The air induction device defines an intake port into the combustion chamber and comprises a throttle valve movable between an open position and a closed position to measure a flow of air. An intake valve is movable to open and close the intake port. A valve actuator is journaled on the engine body for rotation to actuate the intake valve. A setting mechanism is arranged to set the valve actuator to an angular position between a first angular position and a second angular positions with the first angular position being advanced relative to the second angular position. A first sensor is arranged to sense a rotational speed of the output shaft and a second sensor is arranged to sense a position of the throttle valve between the open and closed positions. A control system is configured to control the setting mechanism based upon the respective signals of the first and second sensors. The control system controlling the setting mechanism to set the valve actuator to an angular position that is different from a present angular position when the signal of the second sensor indicates that the throttle valve is generally at the closed position and the signal of the first sensor indicates that the rotational speed of the output shaft is greater than a preset speed.

In accordance with a still further aspect of the present invention, an internal combustion engine for a marine drive comprises an engine body and a movable member movable relative to the engine body. The engine body and the movable member together define a combustion chamber. An air induction device is arranged to introduce air to the combustion chamber. The air induction device defines an intake port next to the combustion chamber. An intake valve is movable between open and closed positions of the intake port. A valve actuator is journaled on the engine body for rotation to actuate the intake valve at a set angular position. A setting mechanism is arranged to set the valve actuator to an angular position between a first angular position and a second angular positions. The first angular position is advanced relative to the second angular position. Means are provided for controlling the setting mechanism. The means controls the setting mechanism to set the valve actuator to an angular position that is closer to the first angular position than a present angular position when an operation of the engine is accelerated under a condition that an engine speed of the engine is less than a preset speed.

In accordance with a yet further aspect of the present invention, a method is provided for controlling an internal combustion engine having an intake valve arranged to admit air to a combustion chamber when opened, a valve actuator arranged to actuate the intake valve at a set angular position, a setting mechanism arranged to set the valve actuator at least between first and second angular positions, the first angular position being advanced relative to the second position, and at least one sensor and a control device. The method comprises determining whether the engine is under an acceleration condition based upon a signal of the sensor and controlling the setting mechanism to advance the valve actuator to an angular position that is closer to the first angular position than a present angular position by the control device when the acceleration condition is determined.

In accordance with a still another aspect of the present invention, a method is provided for controlling an internal combustion engine having an intake valve arranged to admit air to a combustion chamber when opened, a valve actuator arranged to actuate the intake valve at a set angular position, a setting mechanism arranged to set the valve actuator to an angular position between a first angular position and a second angular position, the first angular position being advanced relative the second position, at least one sensor, and a control device. The method comprises determining whether an engine speed is greater than a preset speed and controlling the setting mechanism to set the valve actuator to an angular position that is different from a present angular position when the engine speed is greater than the preset speed.

In accordance with a yet another aspect of the present invention, a method is provided for controlling an internal combustion engine having a throttle valve arranged to measure an amount of air, an intake valve arranged to admit the air to a combustion chamber when opened, a valve actuator arranged to actuate the intake valve at a set angular position, a setting mechanism arranged to set the valve actuator to an angular position between a first angular position and a second angular position, the first angular position being advanced relative to the second position, at least one sensor and a control device. The method comprises determining whether the throttle valve is generally in a closed position, determining whether an engine speed is greater than a preset speed and controlling the setting mechanism to set the valve actuator to an angular position that is different from a present angular position when the throttle valve is generally closed and the engine speed is greater than the preset speed.

BRIEF DESCRIPTION OF THE DRAWINGS

These and other features, aspects and advantages of the present invention will now be described with reference to the drawings of several preferred embodiments, which are intended to illustrate and not to limit the invention. The drawings comprise 14 figures.

DETAILED DESCRIPTION OF THE PREFERRED EMBODIMENTS OF THE INVENTION

Figure 1:
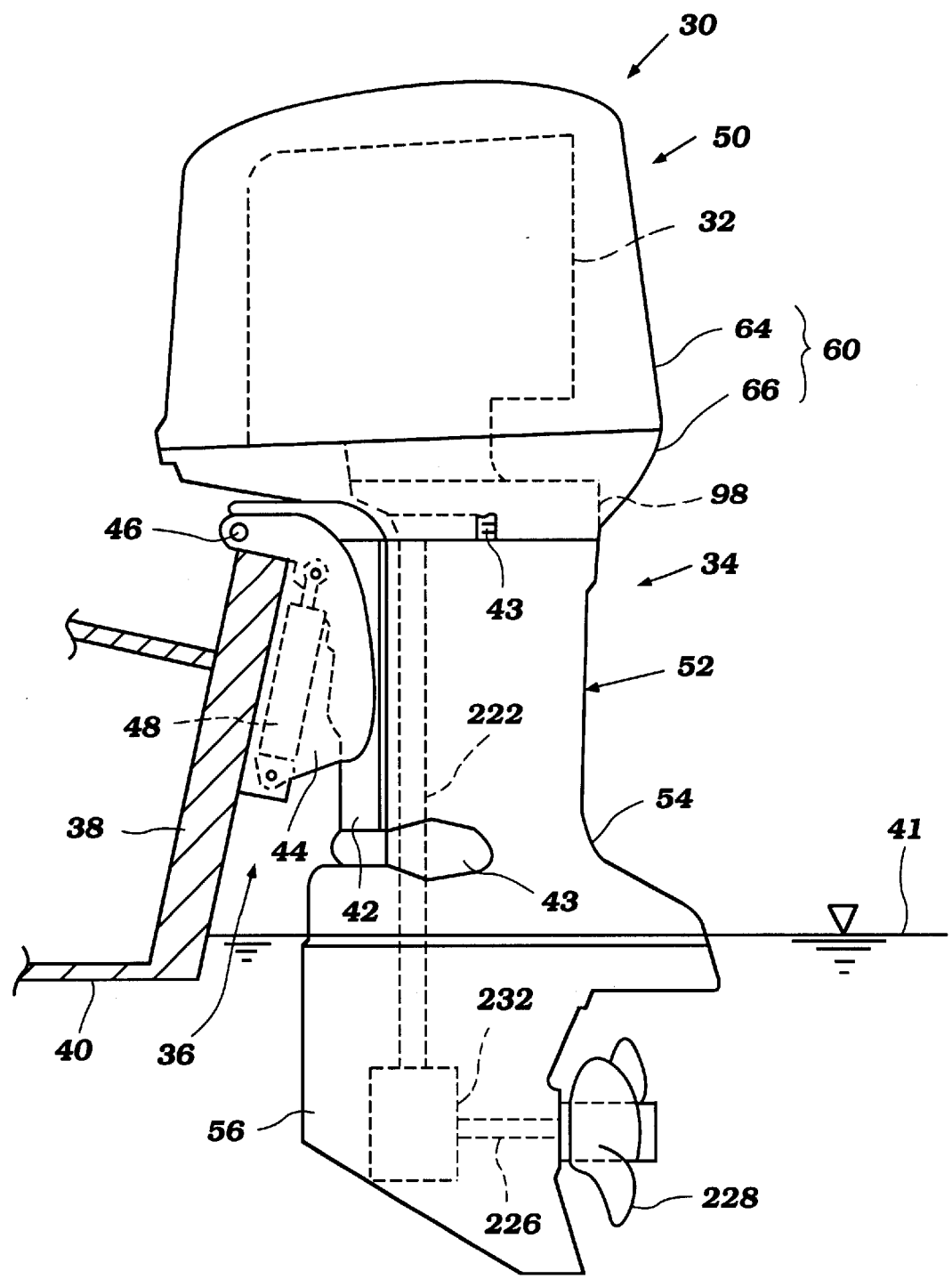
FIG. 1 is a side elevational view of an outboard motor configured in accordance with a preferred embodiment of the present invention.

With reference to FIGS. 1–7, an overall construction of an outboard motor 30 that employs an internal combustion engine 32 configured in accordance with certain features, aspects and advantages of the present invention will be described. The engine 32 has particular utility in the context of a marine drive, such as the outboard motor, and thus is described in the context of an outboard motor. The engine 32, however, can be used with other types of marine drives (i.e., inboard motors, inboard/outboard motors, etc.) and also certain land vehicles. Furthermore, the engine 32 can be used as a stationary engine for some applications that will become apparent to those of ordinary skill in the art.

In the illustrated arrangement, the outboard motor 30 generally comprises a drive unit 34 and a bracket assembly 36. The bracket assembly 36 supports the drive unit 34 on a transom 38 of an associated watercraft 40 and places a marine propulsion device 228 in a submerged position with the watercraft 40 resting relative to a surface 41 of a body of water. The bracket assembly 36 preferably comprises a swivel bracket 42, a clamping bracket 44, a steering shaft and a pivot pin 46.

The steering shaft typically extends through the swivel bracket 42 and is affixed to the drive unit 34 by top and bottom mount assemblies 43. The steering shaft is pivotally journaled for steering movement about a generally vertically extending steering axis defined within the swivel bracket 42. The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used through this description, the terms "forward," "forwardly" and "front" mean at or to the side where the bracket assembly 36 is located, and the terms "rear," "reverse," "backwardly" and "rearwardly" mean at or to the opposite side of the front side, unless indicated otherwise or otherwise readily apparent from the context use.

A hydraulic tilt and trim adjustment system 48 preferably is provided between the swivel bracket 42 and the clamping bracket 44 for tilt movement (raising or lowering) of the swivel bracket 42 and the drive unit 34 relative to the clamping bracket 44. Otherwise, the outboard motor 30 can have a manually operated system for tilting the drive unit 34. Typically, the term "tilt movement", when used in a broad sense, comprises both a tilt movement and a trim adjustment movement.

The illustrated drive unit 34 comprises a power head 50 and a housing unit 52 which includes a driveshaft housing 54 and a lower unit 56. The power head 50 is disposed atop the drive unit 34 and includes an internal combustion engine 32 that is positioned within a protective cowling 60 that preferably is made of plastic. Preferably, the protective cowling 60 defines a generally closed cavity 62 in which the engine 32 is disposed. The protective cowling assembly 60 preferably comprises a top cowling member 64 and a bottom cowling member 66. The top cowling member 64 preferably is detachably affixed to the bottom cowling member 66 by a coupling mechanism so that a user, operator, mechanic or repairperson can access the engine 32 for maintenance or for other purposes.

Figure 2:
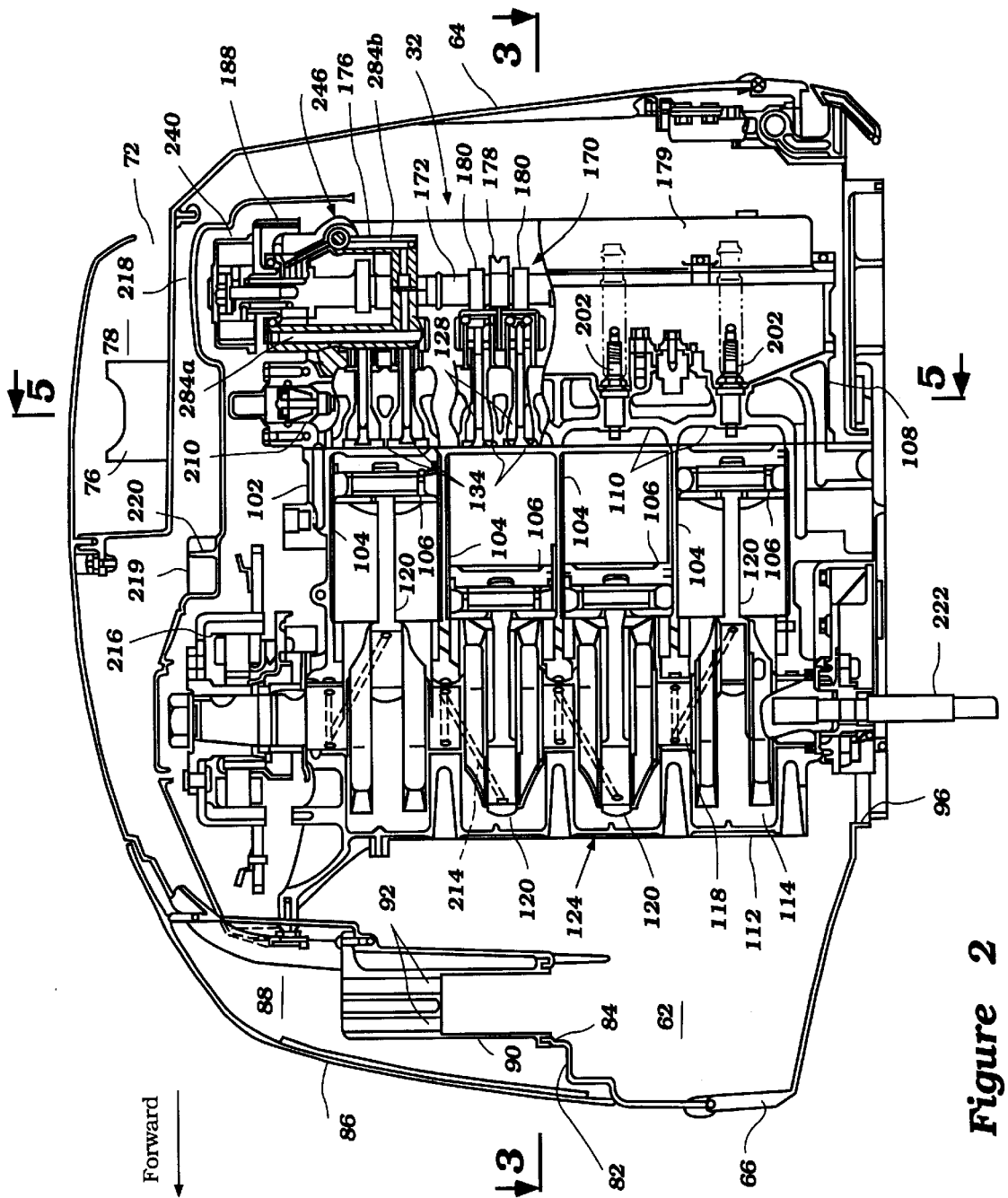
FIG. 2 is a sectional port side view of a power head of the outboard motor. An engine of the power head is shown in section. A camshaft drive mechanism generally is omitted in this figure with the exception of an intake driven sprocket.
Figure 5:
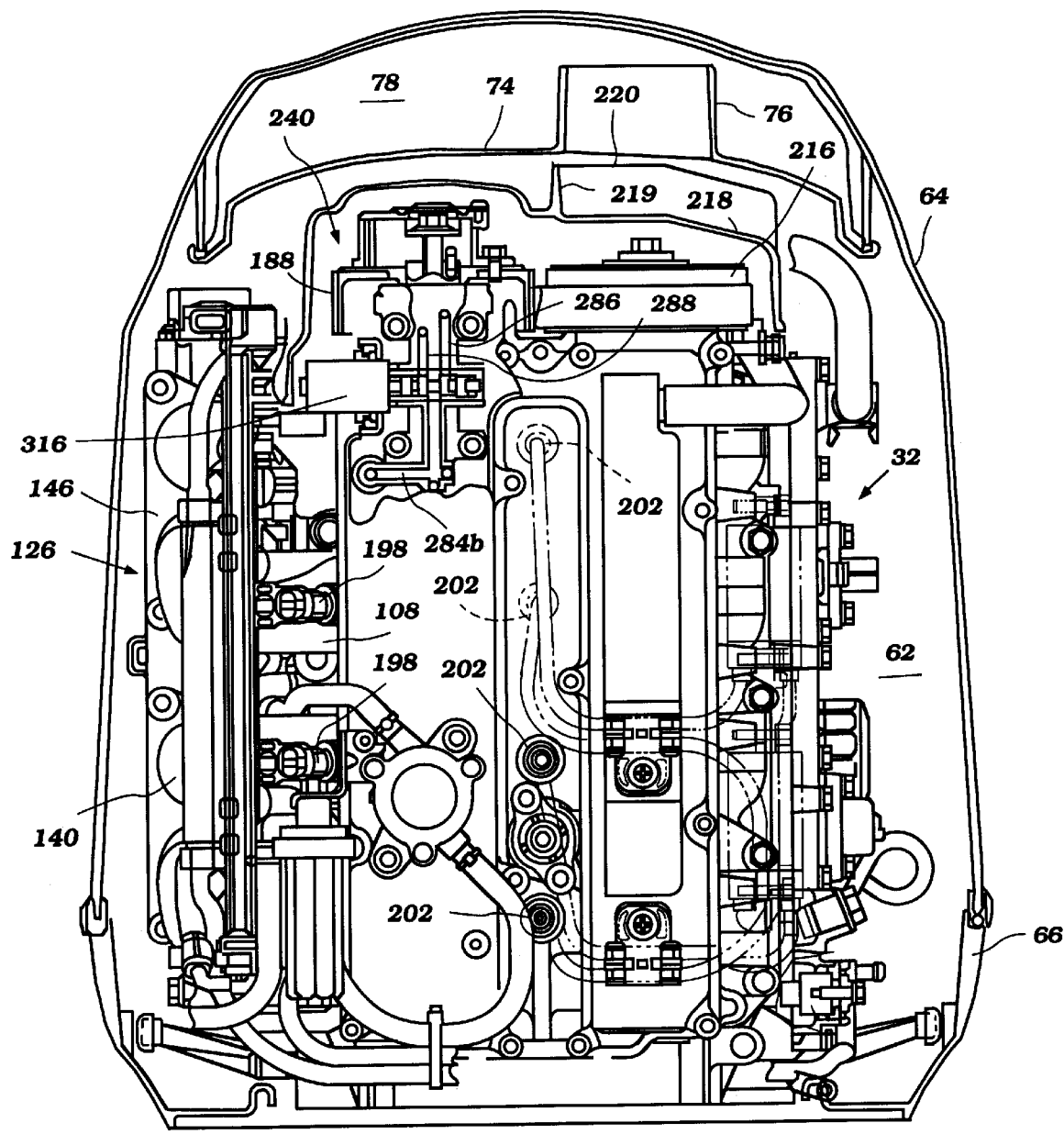
FIG. 5 is a rear view of the power head. The cowling assembly is shown sectioned along the line 5—5 of FIG. 2.

With reference now to FIG. 2, the top cowling member 64 preferably has a rear intake opening 72 on its rear and top portion. A rear intake member 74 with a rear air duct 76 is affixed to the top cowling member 64. The rear intake member 74, together with the rear top portion of the top cowling member 64, forms a rear air intake space 78. With reference now to FIG. 5, the rear air duct 74 preferably is disposed to the starboard side of a central portion of the rear intake member 74.

With reference again to FIG. 2, the top cowling member 64 also defines a recessed portion 82 at a front end thereof. An opening 84 is defined along a portion of the recessed portion 82 on the starboard side. The opening 84 extends into the interior of the top cowling member 64. An outer shell 86 is disposed over the recessed portion 82 to define a front air intake space 88. A front air duct 90 is affixed to the recessed portion 82 of the top cowling member 64 and extends upward from the opening 84. In this manner, the air flow path into the closed cavity 62 can include an elevated entrance from the front air intake space 88. The air duct 90 preferably has a plurality of apertures 92, each of which preferably is cylindrical.

A front intake opening (not shown) preferably is defined between the recessed portion 82 of the top cowling member 82 and the outer shell 86 so that the front intake space 88 communicates with outside of the cowling assembly 60. Ambient air thus is drawn into the closed cavity 62 through the rear intake opening 72 or the front intake opening (not shown) and further through the air ducts 76, 90. Typically, the top cowling member 64 tapers in girth toward its top surface, which is in the general proximity of the air intake opening 72.

The bottom cowling member 66 preferably has an opening 96 through which an upper portion of an exhaust guide member 98 (see FIG. 1) extends. The exhaust guide member 98 preferably is made of aluminum alloy and is affixed atop the driveshaft housing 54. The bottom cowling member 66 and the exhaust guide member 98 together generally form a tray. The engine 32 is placed onto this tray and is affixed to the exhaust guide member 98. The exhaust guide member 98 also has an exhaust passage through which burnt charges (e.g., exhaust gases) from the engine 32 are discharged.

The engine 32 in the illustrated embodiment preferably operates on a four-cycle combustion principle. The engine 32 has a cylinder block 102. The presently preferred cylinder block 102 defines in-line four cylinder bores 104 which extend generally horizontally and which are generally vertically spaced from one another. As used in this description, the term "horizontally" means that the subject portions, members or components extend generally in parallel to the water line 41 when the associated watercraft 40 is substantially stationary with respect to the water line 41 and when the drive unit 34 is not tilted and is placed in the position shown in FIG. 1. The term "vertically" in turn means that portions, members or components extend generally normal to those that extend horizontally. This type of engine, however, merely exemplifies one type of engine on which various aspects and features of the present invention can be suitably used. Engines having other numbers of cylinders, having other cylinder arrangements (V, opposing, etc.), and operating on other combustion principles (e.g., crankcase compression two-stroke or rotary) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore.

A moveable member, such as a reciprocating piston 106, moves relative to the cylinder block 102 in a suitable manner. In the illustrated arrangement, a piston 106 reciprocates within each cylinder bore 104.

A cylinder head assembly 108 is affixed to one end of the cylinder block 102 to close that end of the cylinder bores 104. The cylinder head assembly 108, together with the associated pistons 106 and cylinder bores 104, preferably defines four combustion chambers 110. Of course, the number of combustion chambers can vary, as indicated above.

A crankcase member 112 closes the other end of the cylinder bores 104 and, together with the cylinder block 102, defines a crankcase chamber 114. A crankshaft or output shaft 118 extends generally vertically through the crankcase chamber 114 and can be journaled for rotation by several bearing blocks (not shown). Connecting rods 120 couple the crankshaft 118 with the respective pistons 106 in any suitable manner. Thus, the crankshaft 118 can rotate with the reciprocal movement of the pistons 106.

Preferably, the crankcase member 112 is located at the most forward position of the engine 32, with the cylinder block 102 and the cylinder head member 108 being disposed rearward from the crankcase member 112, one after another. Generally, the cylinder block 102 (or individual cylinder bodies), the cylinder head member 108 and the crankcase member 112 together define an engine body 124. Preferably, at least these major engine portions 102, 108, 112 are made of an aluminum alloy. The aluminum alloy advantageously increases strength over cast iron while decreasing the weight of the engine body 96.

Figure 6:
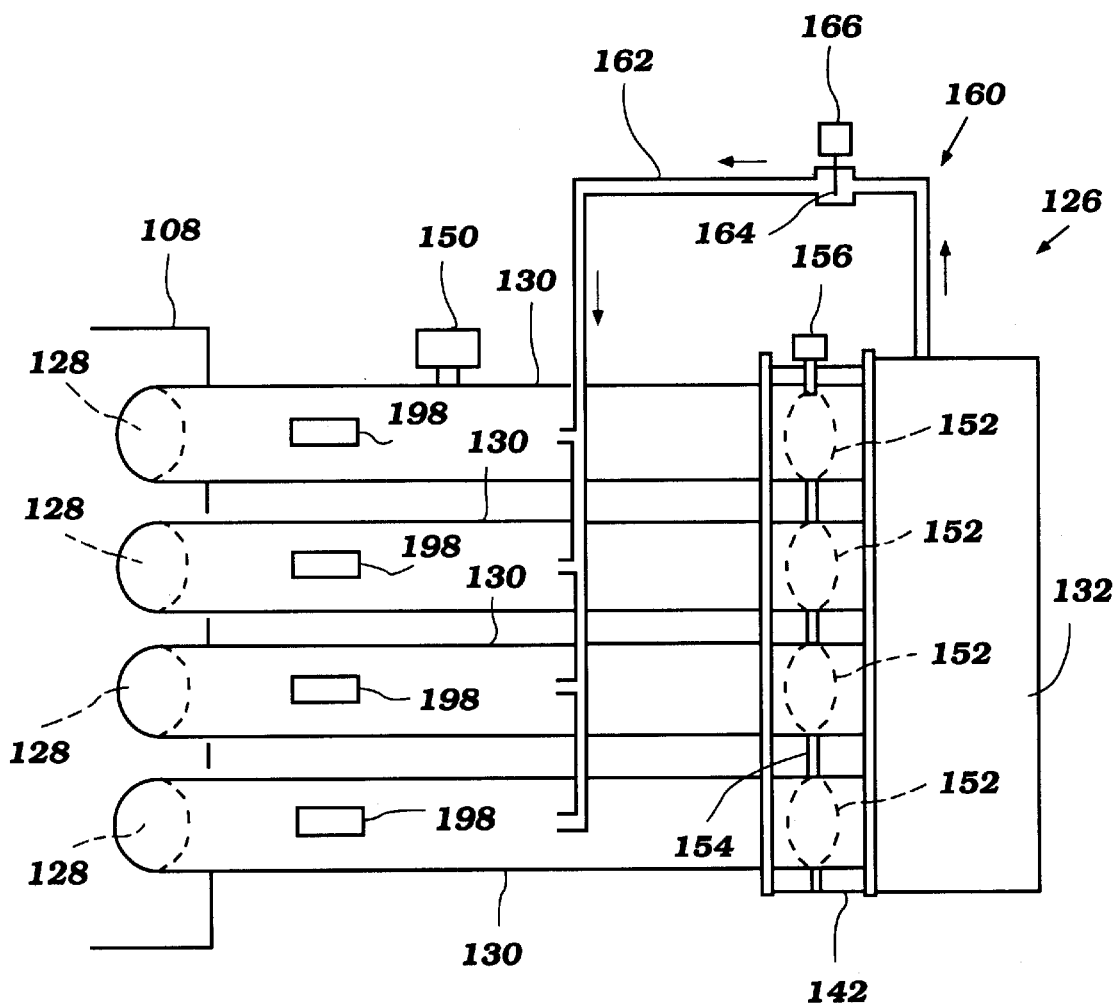
FIG. 6 is a schematic illustration of an air intake system that can be used with the engine.

The engine 32 also comprises an air induction system or device 126. The air induction system 126 draws air from within the cavity 62 to the combustion chambers 110. As illustrated in FIGS. 2 and 6, the air induction system 126 preferably comprises eight intake ports 128, four intake passages 130 and a single plenum chamber 132. In the illustrated arrangement, two intake ports 128 are allotted to each combustion chamber 110 and the two intake ports communicate with a single intake passage 130.

The intake ports 128 are defined in the cylinder head assembly 108. Intake valves 134 are slidably disposed at the cylinder head member 108 to move between an open position and a closed position. As such, the valves 134 act to open and close the ports 128 to control the flow of air into the combustion chamber 110.

Biasing members, such as springs 136 (see FIG. 7), are used to urge the intake valves 134 toward the respective closed positions by acting being a mounting boss formed on the illustrated cylinder head assembly 108 and a corresponding retainer 138 that is affixed to each of the valves 134. When each intake valve 134 is in the open position, the intake passage 130 that is associated with the intake port 128 communicates with the associated combustion chamber 110.

Figure 3:
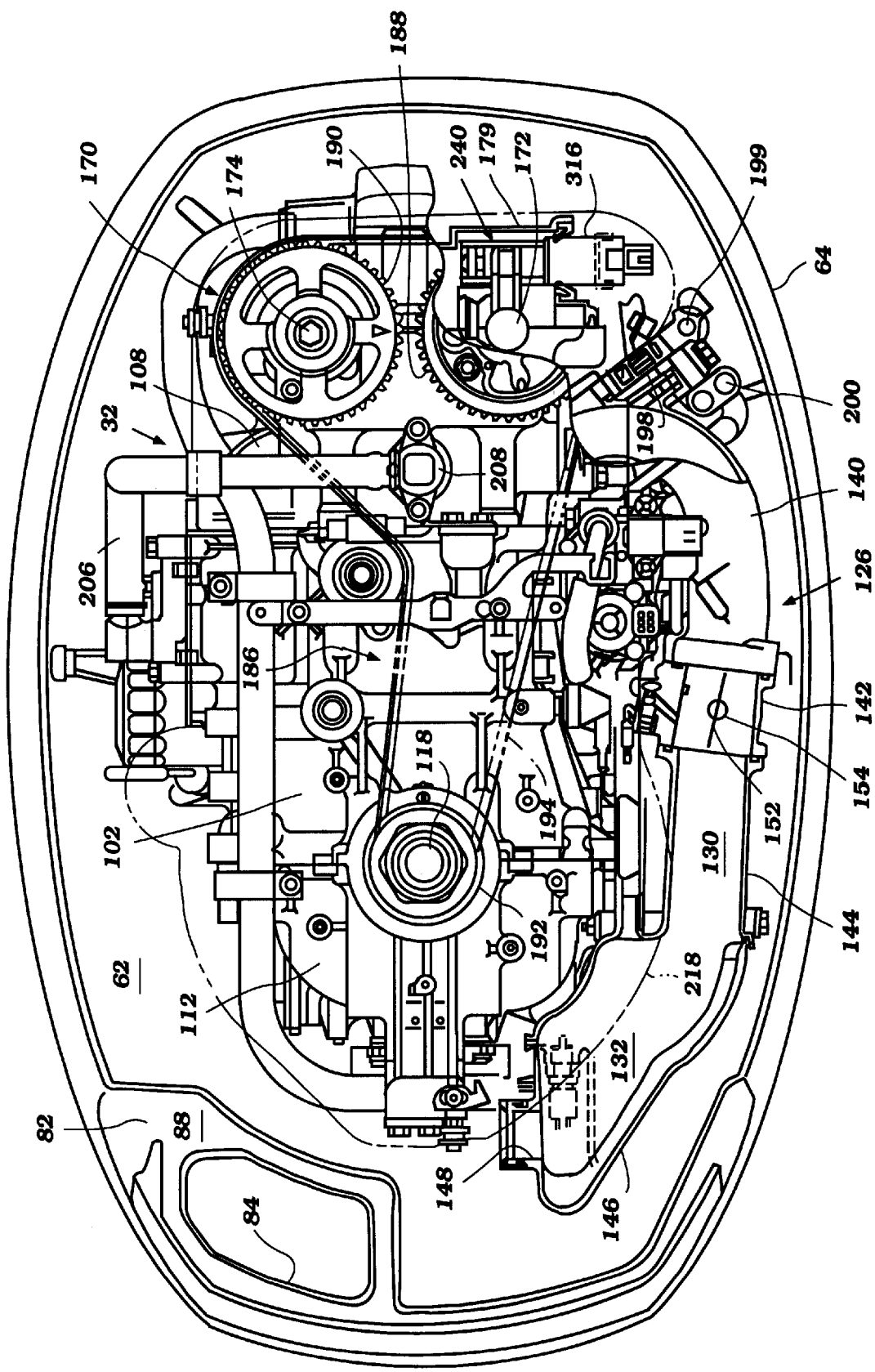
FIG. 3 is a top plan view of the power head. A cowling assembly is shown sectioned along the line 3—3 of FIG. 2. A protective cover is shown in phantom line.
Figure 4:
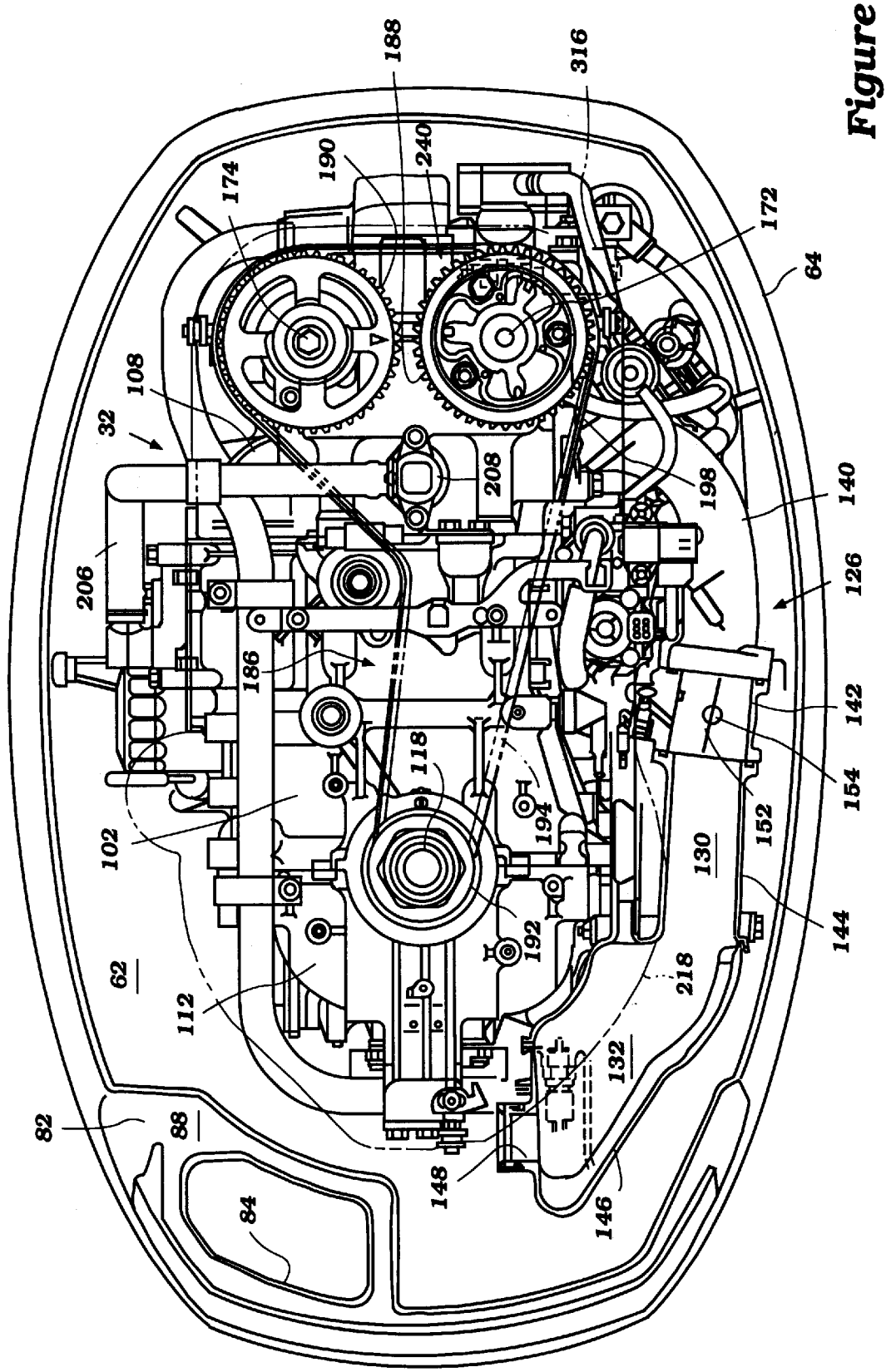
FIG. 4 is a top plan view of the power head and is similar to that shown in FIG. 3 with certain covers removed.

With reference now to FIGS. 3 and 4, each intake passage 130 preferably is defined with an intake manifold 140, a throttle body 142 and an intake runner 144. The intake manifold 140 and the throttle body 142 preferably are made of aluminum alloy, while the intake runner 144 is made of plastic. A portion of the illustrated intake runner 144 extends forwardly alongside of and to the front of the crankcase member 112.

With continued reference to FIGS. 3 and 4, the respective portions of the intake runners 144, together with a plenum chamber member 146, define the plenum chamber 132. Preferably, the plenum chamber member 146 also is made of plastic. The plenum chamber 132 comprises an air inlet 148. The air in the closed cavity 62 is drawn into the plenum chamber 132 through the air inlet 148. The air is then passed through intake passages 130, the throttle body 142 and the intake manifold 140. In some arrangements, the plenum chamber 132 acts as an intake silencer to steady the flow of air into the respective combustion chambers.

In the illustrated embodiment, such as that shown in FIG. 6, the uppermost intake passage 130, i.e., the intake manifold 140 or the intake runner 144, comprises an intake pressure sensor 150 to sense a pressure in the associated intake passage 130. The throttle valve position sensor and the intake pressure sensor preferably are selected from a type of sensor that indirectly senses an amount of air in the induction system. Another type of sensor that directly senses the air amount, of course, can be applicable. For example, moving vane types, heat wire types and Karman Vortex types of air flow meters also can be used. Because the respective intake passages 130 are formed such that each generally is the same size as the others, and because the plenum chamber 132 collects a large volume of air that is supplied to each of the intake passages 130, every passage 130 has substantially equal pressure and a signal of the pressure sensor 150 thus can represent a condition of the respective pressure. Thus, it should be appreciated that a single pressure sensor or multiple pressure sensors can be used. A single pressure sensor simplifies the construction of the engine while reducing the cost by eliminating components. Additionally, it should be appreciated that the pressure sensor can be disposed along any of the intake passages 130 and that the uppermost passage happens to provide the easiest access for maintenance and assembly purposes.

Each illustrated throttle body 142 has a throttle valve 152 journaled for pivotal movement about an axis defined by a generally vertically-extending valve shaft 154. Each valve shaft 154 can be coupled with the other valve shafts to allow simultaneous movement. Thus, the valve shaft 154 is operable by the operator through an appropriate conventional throttle valve linkage. The throttle valves 152 are movable between an open position and a closed position to measure or regulate an amount of air flowing through the respective air intake passages 130. Normally, the greater the opening degree, the higher the rate of airflow and the higher the engine speed.

In order to bring the engine 32 to idle speed and to maintain this speed, the throttle valves 152 generally are substantially closed. Preferably, the valves are not fully closed to produce a more stable idle speed and to prevent sticking of the throttle valves 152 in the closed position. As used through the description, the term "idle speed" generally means a low engine speed that achieved when the throttle valves 152 are closed but also includes a state such that the valves 152 are slightly more open to allow a minute amount of air to flow through the intake passages 130. A throttle position sensor 156 (see FIG. 6) preferably is disposed atop the valve shaft 154 to sense a position between the open and closed positions of the throttle valves 152.

As seen in FIG. 6, the air induction system 126 preferably includes an idle air delivery device or idle speed control (ISC) mechanism 160 that bypasses the throttle valves 152 and extends from the plenum chamber 132 to the respective intake passages 130 downstream of the throttle valves 152. Idle air, thus, is delivered to the combustion chambers 110 through the idle air delivery device 160 to the combustion chambers 110 when the throttle valves 152 are placed in a substantially closed or closed position.

The idle air delivery device 160 preferably comprises an idle air passage 162, an idle valve 164 and an idle valve actuator 166. The idle air passage 162 is branched off to the respective intake passages 130. Preferably, the length from inlet to outlet of each branch of the idle air delivery device 160 is approximately equal. The idle valve 164 controls flow through the idle air passage such that the amount of air flow can be fine tuned. Preferably, the idle valve 164 is a needle valve that can move between an open position and a closed position, which closes the idle air passage 162. The idle valve actuator 166 actuates the idle valve 164 to a certain position to measure or adjust an amount of the idle air.

The engine 32 also includes an exhaust system that routes burnt charges, i.e., exhaust gases, to a location outside of the outboard motor 30. Each cylinder bore 104 preferably has two exhaust ports (not shown) defined in the cylinder head member 108. The exhaust ports (not shown) can be selectively opened and closed by exhaust valves (not shown). The construction of each exhaust valve and the arrangement of the exhaust valves are substantially the same as the intake valve and the arrangement thereof, respectively.

An exhaust manifold (not shown) preferably is disposed next to the exhaust ports (not shown) and extends generally vertically. The exhaust manifold (not shown) communicates with the combustion chambers 110 through the exhaust ports (not shown) to collect exhaust gases therefrom. The exhaust manifold (not shown) is coupled with the foregoing exhaust passage (not shown) of the exhaust guide member 98. When the exhaust ports (not shown) are opened, the combustion chambers 110 communicate with the exhaust passage (not shown) through the exhaust manifold.

A valve cam mechanism, or valve actuator 170, preferably is provided for actuating the intake valves 134 and the exhaust valves (not shown). In the illustrated embodiment, the valve cam mechanism 170 includes an intake camshaft 172 and an exhaust camshaft 174 both extending generally vertically and journaled for rotation relative to the cylinder head member 108. In the illustrated arrangement, bearing caps 176, 178 journal the camshafts 172, 174 (see FIG. 2). A camshaft cover 179 is affixed to the cylinder head member 108 to cover the camshafts 172, 174.

Figure 7:
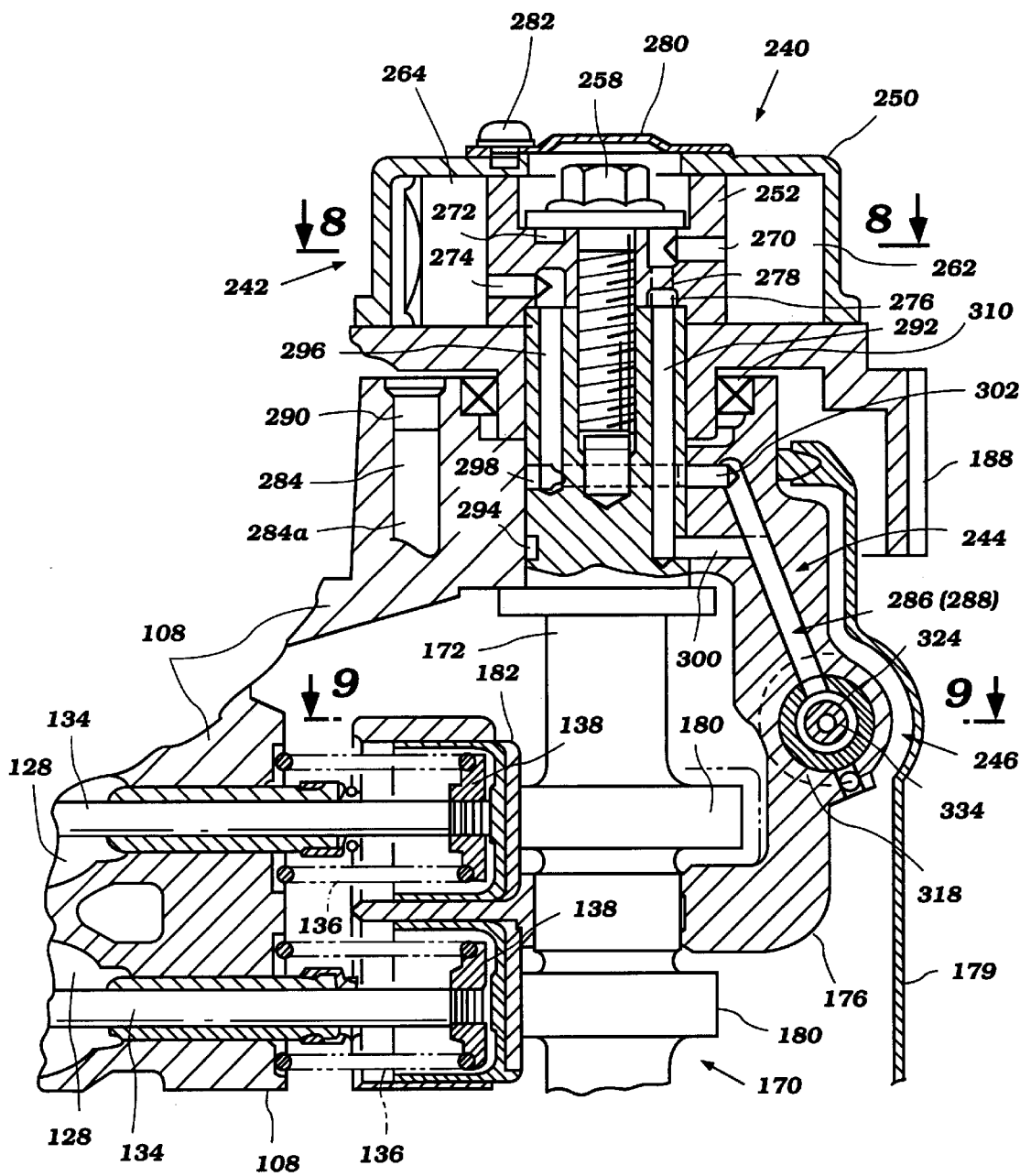
FIG. 7 is an enlarged, sectional side view of the engine, which includes a variable valve timing (VVT) mechanism that is arranged and configured in accordance with certain features, aspects and advantages of the present invention.

Each camshaft 172, 174, as best seen in FIG. 7, has cam lobes 180 to push valve lifters 182 that are affixed to the respective ends of the intake valves 134 and exhaust valves as in any suitable manner. The cam lobes 180 repeatedly push the valve lifters 182 in a timed manner, which is in proportion to the engine speed. The movement of the lifters 182 generally is timed by the rotation of the camshafts 172, 174 to appropriately actuate the intake valves 134 and the exhaust valves (not shown).

A camshaft drive mechanism 186 (see FIGS. 3 and 4) is provided for driving the valve cam mechanism 170. As best seen in FIG. 3, while the intake camshaft 172 and the exhaust camshaft 174 comprise an intake driven sprocket 188 positioned atop the intake camshaft 172 and an exhaust driven sprocket 190 positioned atop the exhaust camshaft 174, respectively. The crankshaft 118 has a drive sprocket 192 positioned almost atop thereof. Of course, other locations of the sprockets also can be used. The illustrated arrangement, however, advantageously results in a compactly arranged engine.

A timing chain or belt 194 is wound around the driven sprockets 188, 190 and the drive sprocket 192. The crankshaft 118 thus drives the respective camshafts 172, 174 through the timing chain 194 in the timed relationship. Because the camshafts 172, 174 must rotate at half of the speed of the rotation of the crankshaft 118 in the four-cycle combustion principle, a diameter of the driven sprockets 188, 190 is twice as large as a diameter of the drive sprocket 192.

The engine 32 preferably has a port or manifold fuel injection system. The fuel injection system preferably comprises four fuel injectors 198 with one fuel injector allotted for each of the respective combustion chambers 110 through suitable fuel conduits 199. The fuel injectors 198 are mounted on a fuel rail 200, which is mounted on the cylinder head member 108. The fuel rail 200 also defines a portion of the fuel conduits 199. Each fuel injector 198 preferably has an injection nozzle directed toward the associated intake passage 130 adjacent to the intake ports 134.

The fuel injectors 198 spray fuel into the intake passages 130 under control of an electronic control unit (ECU) that is mounted on the engine body 124 at an appropriate location. The ECU controls both the start timing and the duration of the fuel injection cycle of the fuel injectors 198 so that the nozzles spray a proper amount of the fuel per combustion cycle. Of course, the fuel injectors 198 can be disposed for direct cylinder injection and carburetors can replace or accompany the fuel injectors 198.

The engine 32 further comprises an ignition or firing system. Each combustion chamber 110 is provided with a spark plug 202 that is connected to the ECU through an igniter so that ignition timing is also controlled by the ECU. Each spark plug 202 has electrodes that are exposed into the associated combustion chamber and are spaced apart from each other with a small gap. The spark plugs 202 generate a spark between the electrodes to ignite an air/fuel charge in the combustion chamber 110 at selected ignition timing under control of the ECU.

In the illustrated engine 32, the pistons 106 reciprocate between top dead center and bottom dead center. When the crankshaft 118 makes two rotations, the pistons 106 generally move from the top dead center to the bottom dead center (the intake stroke), from the bottom dead center to the top dead center (the compression stroke), from the top dead center to the bottom dead center (the power stroke) and from the bottom dead center to the top dead center (the exhaust stroke). During the four strokes of the pistons 106, the camshafts 172, 174 make one rotation and actuate the intake valves 134 and the exhaust valves (not shown) to open the intake ports 128 during the intake stroke and to open exhaust ports during the exhaust stroke, respectively.

Generally, during the intake stroke, air is drawn into the combustion chambers 110 through the air intake passages 130 and fuel is injected into the intake passages 130 by the fuel injectors 198. The air and the fuel thus are mixed to form the air/fuel charge in the combustion chambers 110. Slightly before or during the power stroke, the respective spark plugs 202 ignite the compressed air/fuel charge in the respective combustion chambers 110. The air/fuel charge thus rapidly burns during the power stroke to move the pistons 106. The burnt charge, i.e., exhaust gases, then are discharged from the combustion chambers 110 during the exhaust stroke.

During engine operation, heat builds in the engine body 124. The engine 32 thus includes a cooling system to cool the engine body 124. The outboard motor 30 preferably employs an open-loop type water cooling system that introduces cooling water from the body of water surrounding the motor 30 and then discharges the water to the water body. The cooling system includes one or more water jackets defined within the engine body 124 through which the introduced water runs to remove the heat of the engine body 124. The cooling system has a water discharge pipe 206 (see FIGS. 3 and 4) that extends along an outer surface of the engine body 124 for conveying the discharge water.

A thermostat chamber 208 preferably is defined at a location where the discharge pipe 206 is connected to the engine body 124 to enclose a thermostat 210 (FIG. 2) that controls flow of the discharge water. When water temperature is relatively low immediately, such as immediately after the engine 32 is started up, the thermostat 210 closes to inhibit the water from flowing out so that the engine 32 can be warmed up quickly. A temperature at which the thermostat opens preferably is set as 50–60° C.

The engine 32 also preferably includes a lubrication system. Although any type of lubrication systems can be applied, a closed-loop type system is employed in the illustrated embodiment. The lubrication system comprises a lubricant tank defining a reservoir cavity, which preferably is positioned within the driveshaft housing 54. An oil pump (not shown) is provided at a desired location, such as atop the driveshaft housing 54, to pressurize the lubricant oil in the reservoir cavity and to pass the lubricant oil through a suction pipe toward certain engine portions, which desirably are lubricated, through lubricant delivery passages. The engine portions that need lubrication include, for example, the crankshaft bearings (not shown), the connecting rods 120 and the pistons 106. For example, portions 214 of the delivery passages (FIG. 2) are defined in the crankshaft 118. Lubricant return passages (not shown) also are provided to return the oil to the lubricant tank for re-circulation.

A flywheel assembly 216 preferably is positioned above atop the crankshaft 118 and is mounted for rotation with the crankshaft 118. The flywheel assembly 216 comprises a flywheel magneto or AC generator that supplies electric power to various electrical components such as the fuel injection system, the ignition system and the ECU. A protective cover 218, which preferably is made of plastic, extends over majority of the top surface of the engine 32 and preferably covers the portion that includes the fly wheel assembly 216 and the camshaft drive mechanism 186.

The protective cover 218 preferably has a rib 219 (FIGS. 2 and 5) that reduces or eliminates the amount of air flowing directly toward the engine portion that has the air induction system 126, i.e., to the portion on the starboard side. The protective cover 218 also preferably has a rib 220 (FIGS. 2 and 5) that substantially or completely inhibits air from flowing directly toward a front portion of the engine body 124. The ribs 219, 222 advantageously help direct the airflow around the engine body 124 to cool the engine body 124. As seen in FIG. 2, a bottom portion, at least in part, of the protective cover 218 desirably is left open to allow heat to radiate from the engine.

The driveshaft housing 54 depends from the power head 50 to support a driveshaft 222 which is coupled with the crankshaft 118 and which extends generally vertically through the driveshaft housing 54. The driveshaft 222 is journaled for rotation and is driven by the crankshaft 118. The driveshaft housing 54 preferably defines an internal section of the exhaust system that leads the majority of exhaust gases to the lower unit 56. An idle discharge section is branched off from the internal section to discharge idle exhaust gases directly out to the atmosphere through a discharge port that is formed on a rear surface of the driveshaft housing 54 in idle speed of the engine 32. The driveshaft 222 preferably drives the oil pump.

The lower unit 56 depends from the driveshaft housing 54 and supports a propulsion shaft 226 (FIG. 1) that is driven by the driveshaft 222. The propulsion shaft 226 extends generally horizontally through the lower unit 56 and is journaled for rotation. A propulsion device is attached to the propulsion shaft 226. In the illustrated arrangement, the propulsion device is a propeller 228 that is affixed to an outer end of the propulsion shaft 226. The propulsion device, however, can take the form of a dual counter-rotating system, a hydrodynamic jet, or any of a number of other suitable propulsion devices.

A transmission 232 preferably is provided between the driveshaft 222 and the propulsion shaft 226, which lie generally normal to each other (i.e., at a 90° shaft angle) to couple together the two shafts 222, 226 by bevel gears. The outboard motor 30 has a clutch mechanism that allows the transmission 232 to change the rotational direction of the propeller 228 among forward, neutral or reverse.

The lower unit 56 also defines an internal section of the exhaust system that is connected with the internal section of the driveshaft housing 54. At engine speeds above idle, the exhaust gases generally are discharged to the body of water surrounding the outboard motor 30 through the internal sections and then a discharge section defined within the hub of the propeller 228. Incidentally, the exhaust system can include a catalytic device at any location in the exhaust system to purify the exhaust gases.

Figure 8:
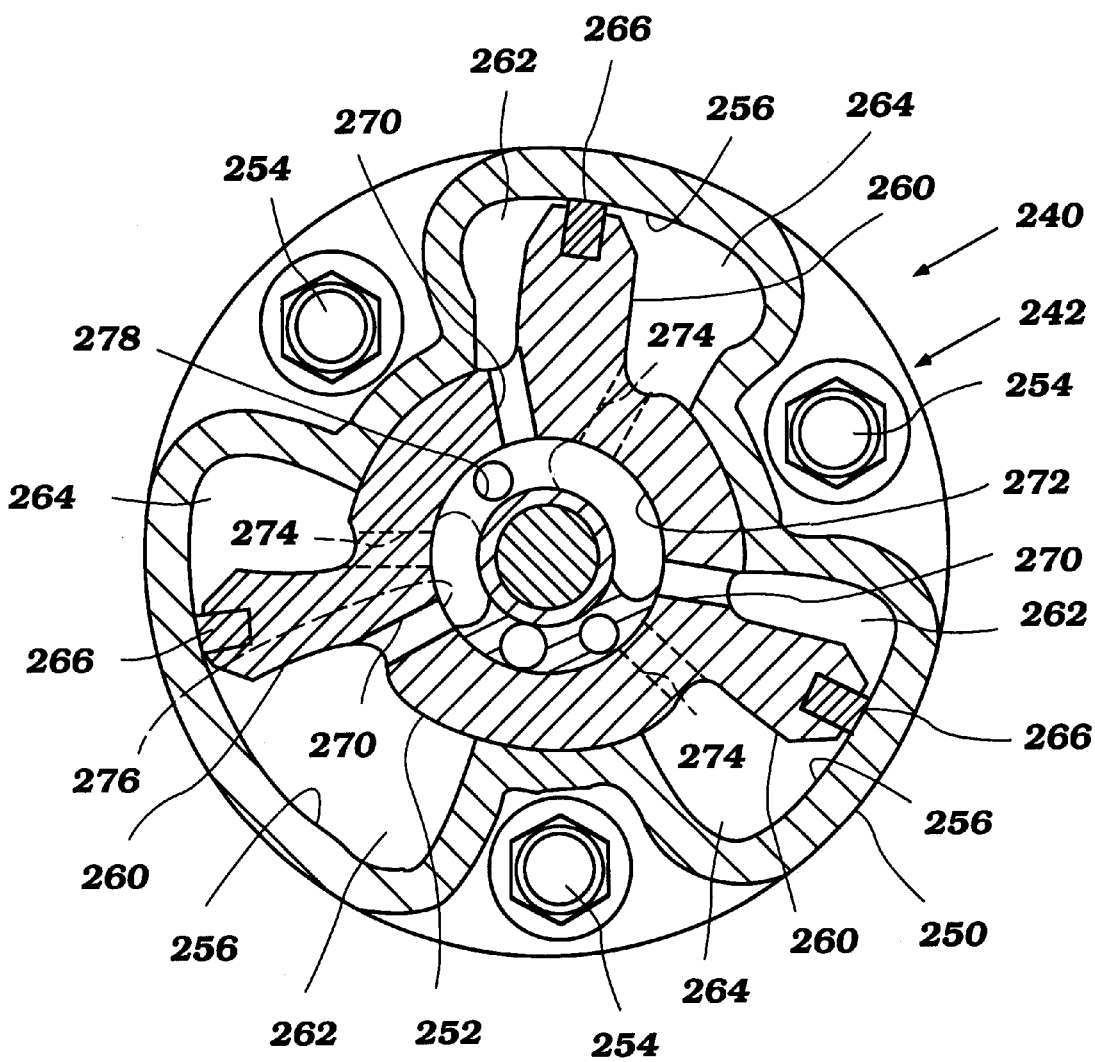
FIG. 8 is a sectional view of the VVT mechanism taken along the line 8—8 of FIG. 7.
Figure 9:
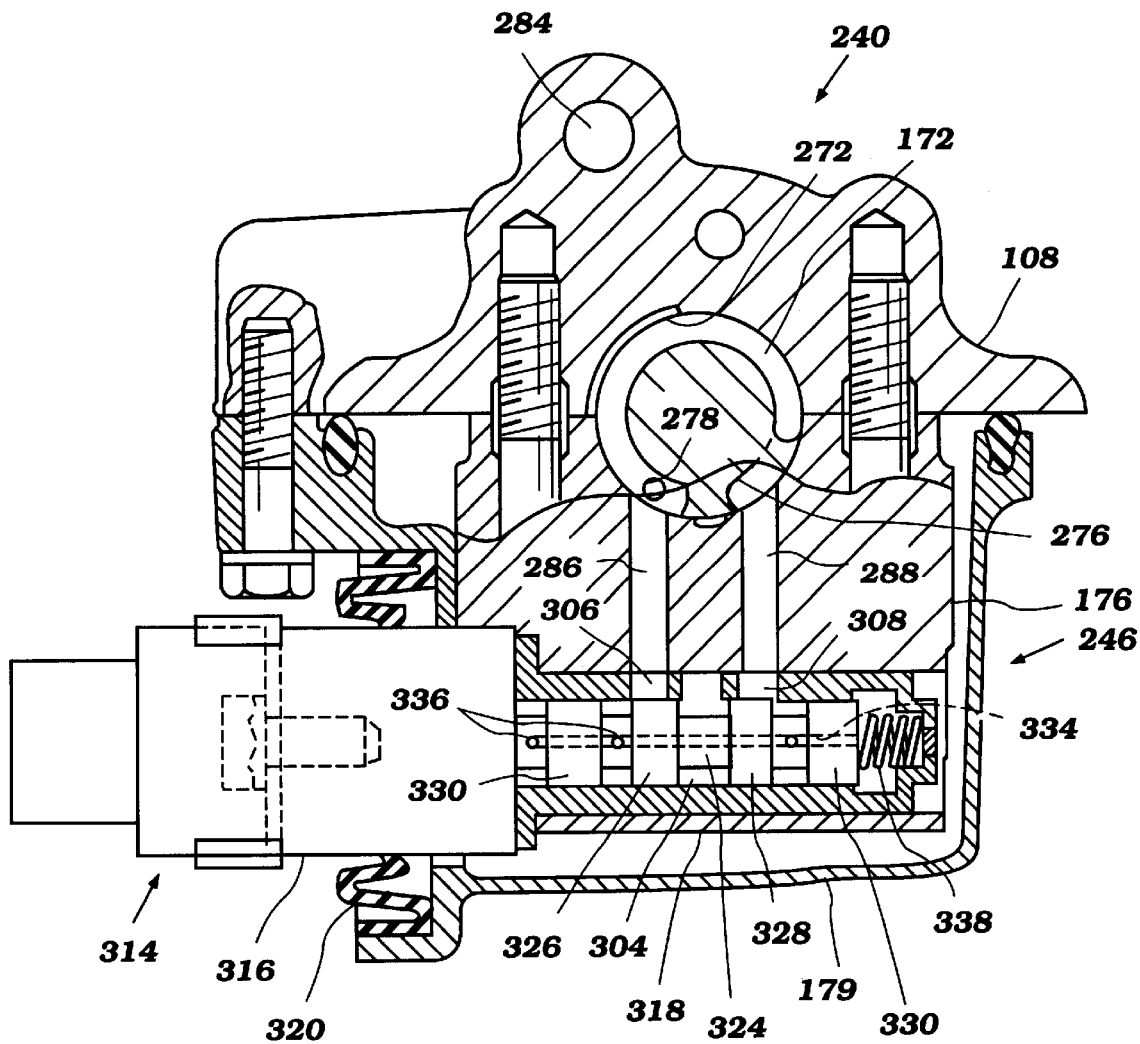
FIG. 9 is a sectional view of the VVT mechanism taken along the line 9—9 of FIG. 7.

With reference still to FIGS. 2–5 and 7, and with reference to FIGS. 8 and 9 as well, the VVT mechanism 240 will now be described below. While the VVT mechanism will be described with reference to the intake system, the exhaust system also can use a VVT mechanism. In some configurations, both the intake system and the exhaust system can use a VVT mechanism.

The VVT mechanism 240 preferably is configured to set the intake camshaft 172 to varied angular positions between two limit angular positions, i.e., a first angular position and a second angular position. When in the first position, the illustrated intake camshaft 172 opens and closes the intake valves 134 at a most advanced timing and, when in the second position, the illustrated intake camshaft 172 opens and closes the intake valves 134 at a most delayed timing. Any timing at a position between the two limit positions is delayed relative to the timing associated with the first position and is advanced relative to the timing associated with the second position.

The VVT mechanism 240 preferably is a hydraulically operated type and thus comprises a setting section 242, a fluid supply section 244 and a control section 246. The setting section 242 sets the intake camshaft 172 to the certain angular position in response to a volume of working fluid that is allotted to two spaces of the setting section 242. The fluid supply section 244 preferably supplies a portion of the lubricant, which is used primarily for the lubrication system, to the setting section 242 as the working fluid. The control section 246 selects the rate or amount of the fluid directed to the setting section 242 under control of the ECU.

The setting section 242 preferably includes an outer housing 250 and an inner rotor 252. The outer housing 250 is affixed to the intake driven sprocket 188 by three bolts 254 in the illustrated arrangement and preferably forms three chambers 256 between the three bolts 254. Any other suitable fastening technique and any suitable number of chambers 256 can be used. The inner rotor 252 is affixed atop the intake camshaft 172 by a bolt 258 and has three vanes 260 pivotally placed within the respective chambers 256 of the housing 250. Again, the number of vanes can be varied and the inner rotor 252 can be attached to the camshaft 172 in any suitable manner.

The vanes 260 preferably extend radially and are spaced apart from each other with an angle of about 120 degrees.

The two sides of the vane 260, together with the walls of each chamber 256 define a first space 262 and a second space 264 respectively. Seal members 266 carried by the respective vanes 260 and abutting on an inner surface of the housing 250 separate the first and second spaces 262, 264 from each other.

The respective first spaces 262 communicate with one another through respective pathways 270 and a ditch 272 that is formed around the bolt 258, while the respective second spaces 264 communicate with one another through respective pathways 274 and a ditch 276 that is also formed around the bolt 258. The ditches 272, 276 generally are configured as an incomplete circular and can be offset from one another (e.g., 60 degrees offset may be used). A pathway 278 extends from the ditch 272 to a bottom portion of the rotor 252 through ends of the ditch 276. A cover member 280 is affixed to the outer housing 250 by screws 282 to cover the bolt 258. The ditches allow fluid communication with the respective pathways during rotation of the camshaft.

The fluid supply section 244 preferably includes a supply passage 284 and two delivery passages 286, 288. The supply passage 284 and the delivery passages 286, 288 communicate with one another through the control section 246. The supply passage 284 preferably has a passage portion 284a defined in the cylinder head member 108 and a passage portion 284b defined in the bearing cap 176.

The supply passage 284 communicates with the lubrication system so that a portion of the lubricant oil is supplied to this VVT mechanism 240. Because the passage portion 284a is formed by a drilling process in the illustrated embodiment, a closure member 290 closes one end of the passage portion 284a.

The delivery passages 286, 288 preferably are defined in a top portion of the camshaft 172 and the bearing cap 176. A portion of the delivery passage 286 formed in the camshaft 172 includes a pathway 292 that extends generally vertically and that communicates with the pathway 278 that communicates with the ditch 272 of the first space 262. The pathway 292 also communicates with a ditch 294 that is formed in the camshaft 172. A portion of the delivery passage 288 formed in the camshaft 172, in turn, includes a pathway 296 that extends generally vertically and communicates with the ditch 276 of the second space 264. The pathway 296 also communicates with a ditch 298 that is formed in the camshaft 172. A portion of the delivery passage 286 formed in the bearing cap 176 includes a pathway 300 that extends generally vertically and generally horizontally to communicate with the ditch 294, while a portion of the delivery passage 288 formed in the bearing cap 176 includes a pathway 302 that extends generally vertically and generally horizontally to communicate with the ditch 298. The other ends of the pathways 300, 302 communicate with a common chamber 304 formed in the control section 246 through ports 306, 308, respectively.

A seal member 310 is inserted between the cylinder head member 108, the camshaft 172 and the bearing cap 176 to inhibit the lubricant from leaking out. It should be noted that FIGS. 7 and 9 show the delivery passages 286, 288 in a schematic fashion. Both the passages 286, 288 do not actually merge together.

The control section 246 preferably includes an oil control valve (OCV) 314. The OCV 314 comprises a housing section 316 and a cylinder section 318. Both the housing and cylinder sections 316, 318 preferably are received in the bearing cap 176. Because the sections 316, 318 together extend through a hole of the camshaft cover 179, a bellow 320 made of rubber is provided between the housing section 316 and the camshaft cover 179 to close and seal the through-hole.

The cylinder section 318 defines the common chamber 304 that communicates the supply passage 284 and the delivery passages 286, 288. The housing section 316 preferably encloses a solenoid type actuator, although other actuators of course are available. A rod 324 extends into the common chamber 304 from the actuator and is axially movable therein. The rod 324 has a pair of valves 326, 328 and a pair of guide portions 330. The valves 326, 328 and the guide portions 330 have an outer diameter that is larger than an outer diameter of the rod 324 itself and generally is equal to an inner diameter of the cylinder 318. The rod 324 defines an internal passage 334 extending through the rod 324 and apertures 336 communicating with the passage 334 and the common chamber 304 to allow free flow of the lubricant in the chamber 304. A coil spring 338 is retained at an end of the cylinder 318 opposite to the housing section 316 to urge the rod 324 toward the actuator.

The actuator, i.e., solenoid, actuates the rod 324 under control of the ECU so that the rod 324 can take any position in the chamber 304. More specifically, the solenoid pushes the rod 324 toward the certain position in compliance with the ECU's commands. If the certain position designated by the ECU is closer to the solenoid than the present position, then the solenoid does not actuate the rod 324 and the coil spring 338 pushes back the rod 324 to the desired position. Otherwise, the solenoid itself pulls the rod 324 back to the position. Both manners are practicable. The valve 326 can close the port 306 entirely or partially, while the valve 328 can close the port 308 entirely or partially. Each rate of the closing degree determines an amount of the lubricant that is allotted to each delivery passage 286, 288 and to each space 262, 264 in the setting section 242. Each allotted rate of the lubricant to each space 262, 264 then determines an angular position of the camshaft 172. If the lubricant is allotted to the first space 262 than to the second space 264, the camshaft 172 is set closer to the most advanced position, and vise versa.

The oil pump pressurizes the lubricant oil to the supply passage 284 and further to the common chamber 304 of the cylinder 318. Meanwhile, the ECU controls the solenoid to place the rod 324 at a position where the respective rates of the closing degrees of the valves 326, 328 are determined so that a corresponding angular position of the camshaft 172 is determined. Preferably, a drain is provided to allow the lubricant oil to drain from the space that is being evacuated while pressurized lubricant oil flows into the opposing space.

In one mode of operation, the lubricant oil is fed to the common chamber 304 of the cylinder 318. Thus, the common chamber 304 has a positive pressure. To move the cam shaft in a first direction relative to the input sprocket, the common chamber is linked with a first of the delivery passages while the other of the delivery passages is linked to a drain. Thus, pressurized oil will flow into a first of the spaces while oil will be displaced from the second of the spaces. The displaced oil flows to a drain and returns to the lubrication system. Once the desired movement has occurred, the rod 324 is returned to a neutral position in which the common chamber is no longer communicating with either of the delivery passages. Additionally, in the neutral position, neither of the delivery passages communicates with the drain in one particularly advantageous arrangement. Of course, by varying the placement and size of the seals, a constant flow can be produced from supply to drain while the rod is in a neutral position. Also, a constant flow into the delivery lines also can be constructed. In the illustrated arrangement, however, no flow preferably occurs with the system in a neutral position.

With reference to FIGS. 10–14, a preferred embodiment of a control system 350 including the ECU, which is now indicated by the reference numeral 352, and control routines of the control system 350 both configured in accordance with the present invention will now be described below.

Figure 10:
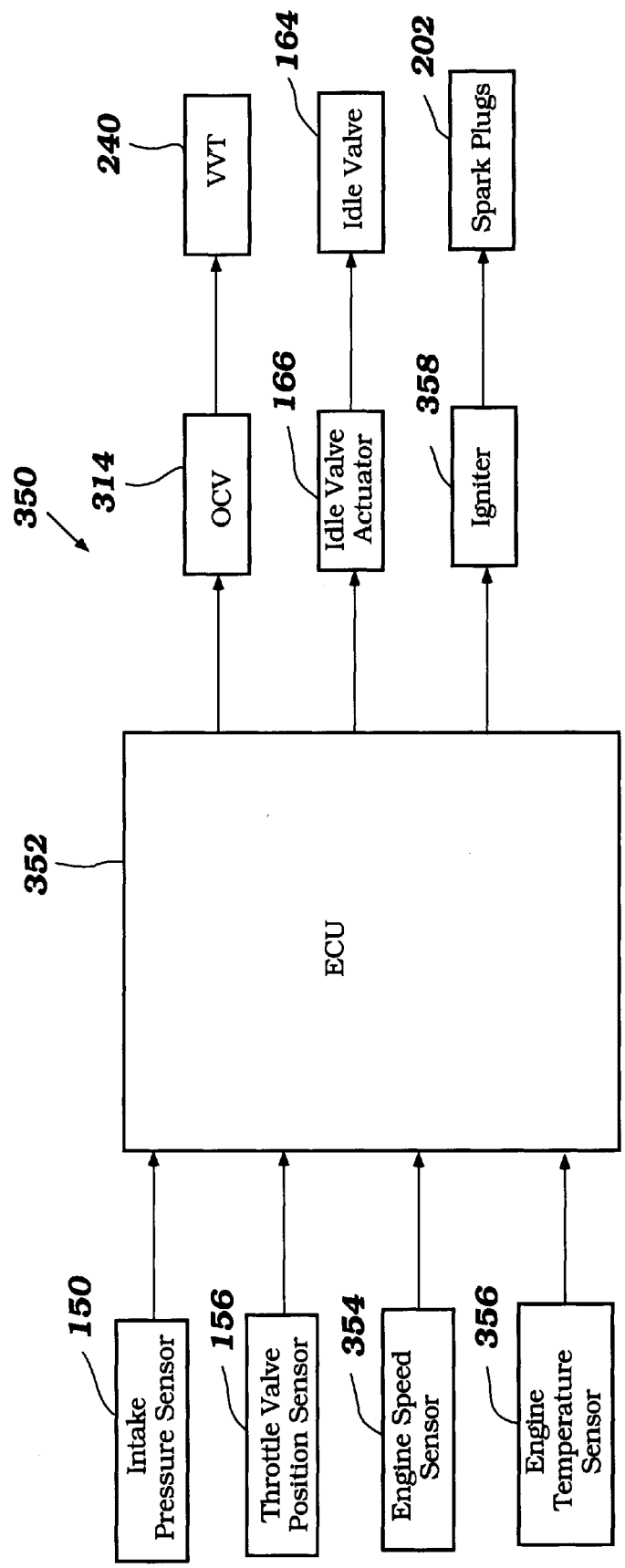
FIG. 10 is a schematic view of a control system that is arranged and configured in accordance with certain features, aspects and advantages of the present invention.

FIG. 10 illustrates a block diagram of the control system 350. The control system 350 generally comprises the intake pressure sensor 150 and the throttle valve position sensor 156, which have been already described, and also an engine speed sensor 354 and an engine temperature sensor 356. The intake pressure sensor 150 and the throttle valve position sensor 156 output respective sensed signals to the ECU 352. A crankshaft angle position sensor preferably is used as the engine speed sensor 354. The crankshaft angle position sensor 354 is associated with the crankshaft 118 and, when measuring crankshaft angle versus time, outputs a crankshaft rotational speed signal, i.e., engine speed signal, to the ECU 352. A water temperature sensor preferably is used as the engine temperature sensor 356. The water temperature sensor 356 is disposed one of the water jackets and outputs a water temperature signal to the ECU 352. Each of the sensors can comprise any suitable sensor that provides the desired output information indicated above. Of course, obvious variants of these sensors that provide related output information also can be used.

The ECU 352 controls the VVT mechanism 240 through the OCV 316 based upon the signals of the intake pressure sensor 150, the throttle valve position sensor 156, the engine speed sensor 354 and/or the engine temperature sensor 356. Combinations of the signals can be varied per control routine as described hereunder. The ECU 352 also controls the idle valve 164 through the idle valve actuator 166 based upon, for example, the signal of the engine speed sensor 354. The ECU 352 further controls, as noted above, the respective spark plugs 202 through the igniter 358 based upon, for example, the signal of the engine speed sensor 354. The ECU 352 still further controls other devices, such as the fuel injectors 198, but these devices are omitted from the diagram of FIG. 10. It should be noted that normally the ECU 352 controls the valve timing and the ignition timing in accordance with a main control routine which is not shown and that the controls described below are subroutines added to the main control routine. It should also be noted that other sensors also can be used.

Figure 11:
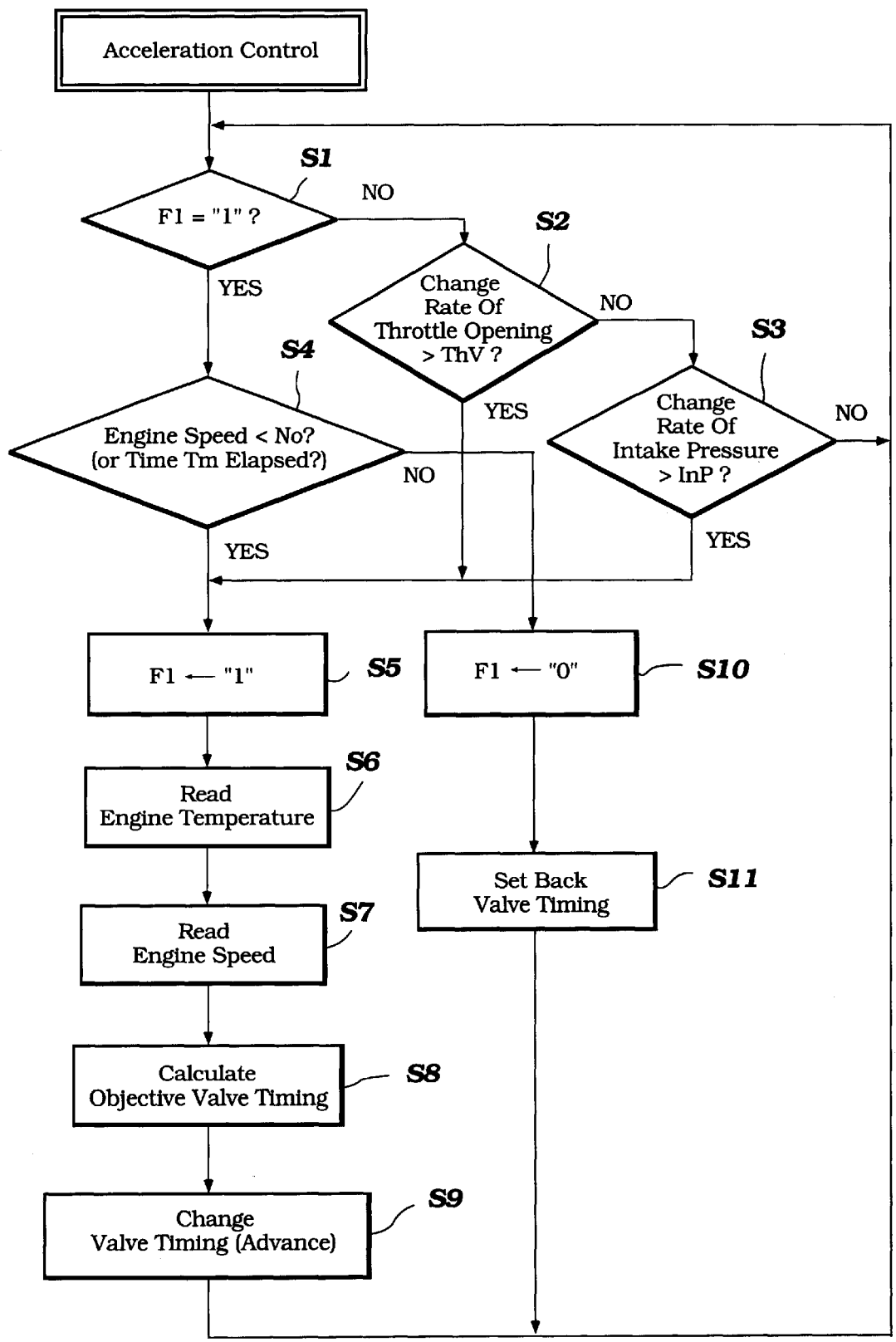
FIG. 11 is an exemplary acceleration control routine that can be practiced by the control system of FIG. 10.

FIG. 11 illustrates a subroutine for control during acceleration. In this control routine, the ECU 352 controls the VVT mechanism 240 to set the angular position of the intake camshaft 172 to a first intermediate position, which preferably is closer to the first limit position (i.e., advanced) than a current position if an acceleration condition is determined. The routine also maintains the shaft in this first intermediate position unless an engine speed exceeds a preset speed or a preset time has elapsed.

With continued reference to FIG. 11, the routine starts and proceeds to the step S1. At the step S1, the ECU 352 determines whether an acceleration flag F1 that indicates the engine 32 is under an acceleration condition designates "1" or not.

If the flag F1 designates "0", e.g., in the first cycle of the control, the routine goes to the step S2 to determine whether a rate of change of the throttle vale opening degree sensed by the throttle valve position sensor 156 is greater than a preset change rate ThV. Preferably, the change rate is about 10 deg/msec. Of course, other values can be used depending upon the application.

If this is positive, the routine goes to the step S5 and sets the acceleration flag F1 to "1". If the determination is negative, the routine goes to the step S3 to determine whether a rate of change of the intake pressure sensed by the intake pressure sensor 150 is greater than a preset change rate InP. The preset rate Inp preferably is about 3 mmHg/msec but other values can be used depending upon the application.

If this is positive, the routine goes to the step S5 and sets the flag F1 to "1" also. If the determination is negative, the routine return to the step S1 and repeats the foregoing steps.

After setting the acceleration flag F1 to "1" at the step S5, the routine continues to the step S6 and the ECU 352 reads an engine temperature sensed by the temperature sensor 356. The routine further continues to the step S7 and the ECU 352 reads an engine speed sensed by the engine speed sensor 354. The routine then continues to the step S8 to calculate an objective valve timing. Of course, as with most of the steps, some rearrangement of the order is possible and some merging of steps also can be done without materially affecting the operation of the routine. For instance, the engine speed can be read before the engine temperature is read. Additionally, the two data can be read simultaneously.

The ECU 352 preferably has two types of control maps that have data regarding valve timings versus engine speeds: one of the maps preferably includes an engine temperature range that is equal to or greater than a threshold temperature and the other of the maps preferably includes another engine temperature range that is smaller than the threshold temperature. The threshold temperature preferably given between 50–60° C. If the sensed temperature is in the range greater than the threshold temperature, the ECU 352 selects the valve timing within the former control map (first map) based upon the sensed engine speed. Similarly, if the sensed temperature is in the smaller range, the ECU 352 selects the valve timing within the latter control map (second map) based upon the sensed engine speed. The first map has valve timings that are advanced but not as advanced as the valve timings in the second map for corresponding engine speeds. In other words, advance degrees in the first map are smaller than advance degrees in the second map. Although any advanced angle that is suitable for the particular application can be selected, an angle of about 30 degrees preferably is selected as the most advanced angle in the first map and an angle of about 15 degrees preferably is selected as the most advanced angle in the second map in the illustrated embodiment.

The routine then goes to the step S9 and the ECU 352 controls the OCV 314 to set the angular position of the camshaft 172 to the advanced position that corresponds to the angle calculated at the step S8.

The routine then returns back to the step S1 to determine again if the acceleration flag F1 designates "1". In this cycle, if the flag F1 has already been changed to "1", the routine goes to the step S4. At the step S4, the routine determines whether the engine speed is less than a preset speed No or not. The preset speed is selected at a medium engine speed and preferably is about 5,000 rpm. If this is affirmative, the routine goes to the step S5 and holds the flag F1 as "1". The steps S6, S7, S8 and S9 following the step S5 thus are all conducted as described above. If the determination is negative, the routine goes to the step S10 and set the flag F1 to "0". The routine then goes to the step S11 to set the valve timing back to the initial timing. In some arrangements, a second valve timing can be calculated rather than having the valve timing returned to a normal valve timing.

The routine also can determine at the step S4 whether a preset time Tm has been elapsed after the first setting of the acceleration flag F1 to "1". Preferably, the preset time is about 2 seconds.

Through the routine of FIG. 11, the valve timing can be advantageously adjusted during rapid acceleration and not so rapid acceleration. By rapid acceleration, it is meant that the throttle valve is fully or substantially fully opened to allow the engine to rapidly increase in speed to a desired engine speed.

Figure 12:
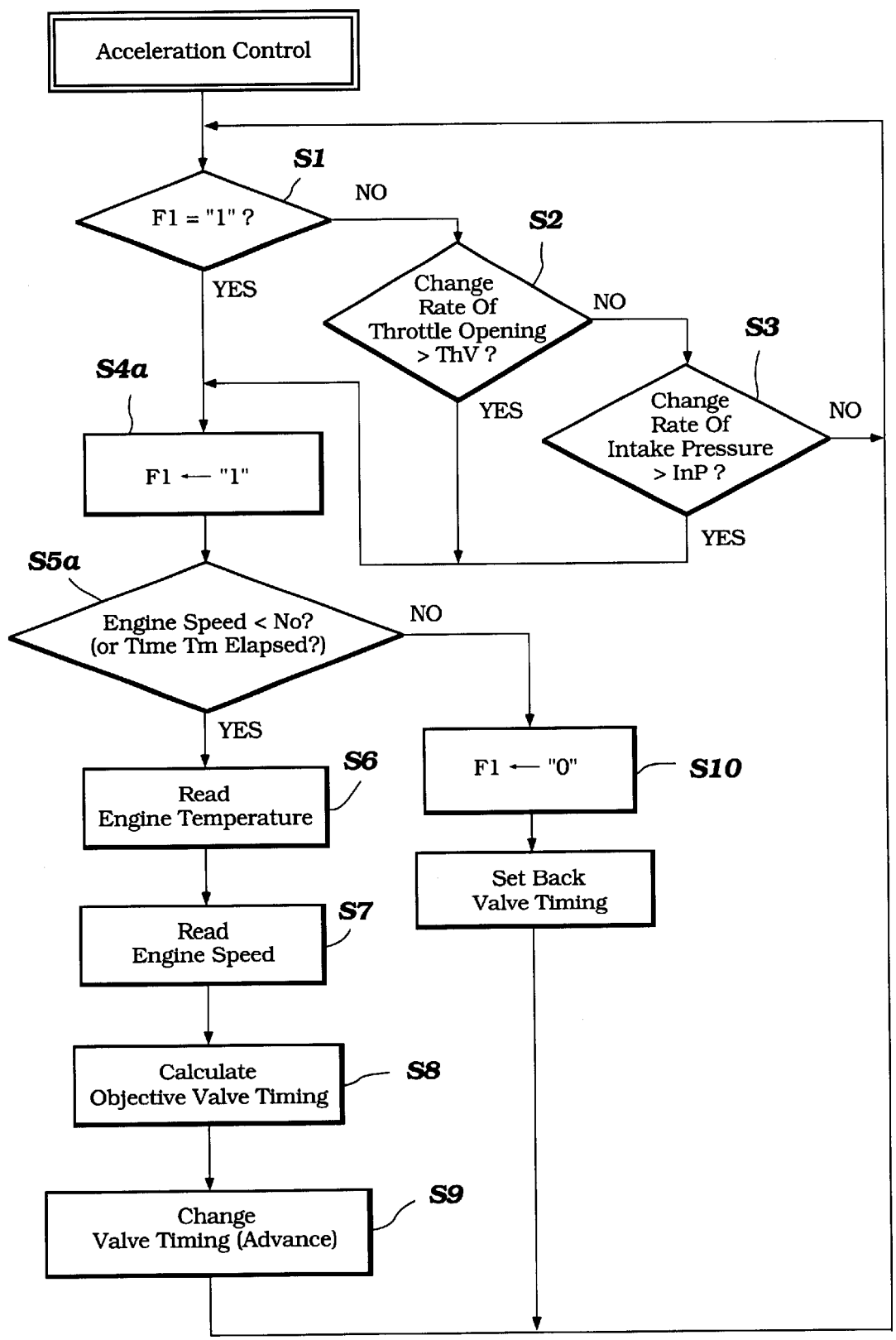
FIG. 12 is another exemplary acceleration control routine that can be practiced by the control system of FIG. 10.

FIG. 12 illustrates another control routine that is useful for control during acceleration. This routine is similar to that of FIG. 11 with a change occurring in the timing of altering the flag value. If either the determination at the step S2 or the step S3 is positive, the routine of FIG. 12 proceeds to the step S4a to set the flag F1 to "1". Then the routine goes to the step S5a to determine whether the engine speed is less than the preset speed $N_0$. If this is positive, the routine goes to the step S6 to read the engine temperature. If the determination is negative, the routine goes to the step S10 to set the flag F1 back to "0". Other than this change, the routine is as described above with respect to FIG. 11. In this control arrangement, the valve timing is not set to the advanced position unless the engine speed is smaller than the preset speed $N_0$. Thus, regardless of whether the throttle is rapidly opened or the intake pressure is rapidly varying, the valve timing is only advanced when the engine speed is below the preset speed.

As thus described, in the illustrated arrangements, the valve timing of the intake camshaft 172 is advanced if the engine speed is less than the medium speed and is held in the advanced position inasmuch as the engine speed is less than the preset speed, or as the preset time has not been elapsed. Because the valve timing is advanced, the engine can generate sufficient torque under the acceleration condition in the range of low and medium engine speed. In addition, because the advanced degree of the valve timing is smaller than the normal advanced degree if the engine temperature is greater than a preset temperature, engine knock advantageously can be inhibited even though a proper torque is obtained in the range of low and medium engine speed. Furthermore, because the illustrated arrangements only vary the valve timing during acceleration or for limited time, the operator of the outboard motor does not experience long term vibrations from the engine.

In some applications, either the step S2 or the step S3 can be omitted if at least one of them is conducted because either one of them would be adequate to recognize that an acceleration condition is present. Additionally, a step using a signal of the air flow meter can be added in the control routine. In this alternative, a change rate of air amount of course can be used to determine if an acceleration condition is present.

Figure 13:
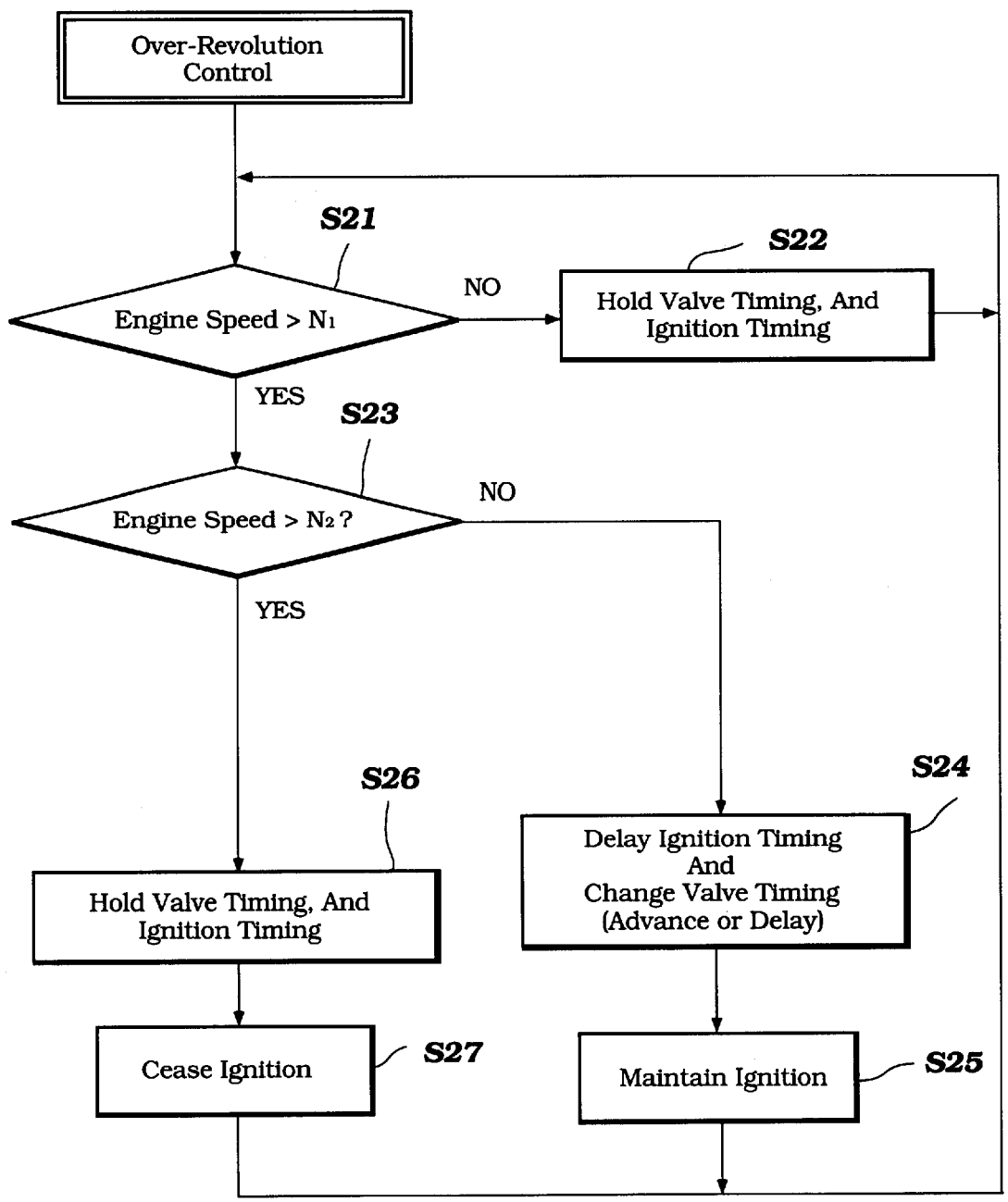
FIG. 13 is an exemplary over-rev control routine that can be practiced by the control system of FIG. 10.

FIG. 13 illustrates a control routine for inhibiting over-revving of the engine. In this control, the ECU 352 controls the VVT mechanism 240 and the spark plugs 202 under certain conditions to provide a rev limiting feature.

The routine starts and proceeds to the step S21. At the step S21, the ECU 352 determines whether an engine speed is greater than a first preset engine speed $N_1$ that preferably is about 6,100 rpm. If this is negative, the engine speed is determined to not be over-revving and the routine goes to the step S22. At the step S22, the ECU 352 controls the OCV 314 to hold the angular position of the intake camshaft 172 at the present angular position and also holds the ignition timing of the spark plugs 202 at the present timing. Under this control, the engine 32 is running normally. The routine then returns back to the step S21 to repeat the control loop.

If the determination at the step S21 is positive, the engine speed is determined to be within the over-rev range and the routine goes to the step S23 to determine whether the engine speed is greater than a second preset engine speed $N_2$ that preferably is about 6,200 rpm.

If the determination at step S21 is negative, the engine speed is within the over-rev warning range but is not high enough to require immediate corrective action. The routine thus goes to the step S24 to control the OCV 314 to set the angular position to an advanced position. Preferably, the advance degree is about 10–15 degrees. At the step S24, the ECU 352 also delays the ignition timing of the spark plugs 202. The delay degree of this ignition timing preferably is about 10 degrees.

The routine then goes to the step S25. At the step S25, the ECU 352 commands the igniter 358 to maintain the ignition of the spark plugs 202, i.e., not to cease igniting of the spark plugs 202. Under this control, the engine 32 gradually slows down. The routine then returns back to the step S21 to repeat the steps.

If the determination at the step S23 is positive, the engine speed is in a serious range of the over-revolution. The routine goes to the step S26 to control the OCV 314 to hold the angular position of the intake camshaft 172 at the present angular position and also to hold the ignition timing of the spark plugs 202 at the present timing. The routine then goes to the step S27.

At the step S27, the ECU 352 commands the igniter 358 to cease igniting of the spark plugs 202. Under the control, the engine 32 slows down more quickly than under the control of steps S24, S25. The routine then returns back to the step S21 to repeat the steps.

In some arrangements, the ECU 352 can control the OCV 314 to set the angular position to a delayed position instead of setting to the advanced position at the step S24. The delay degree preferably is about 10–15 degrees. Under this control, the engine 32 can also slow down gradually.

As thus described, the over-rev control in the illustrated embodiment does not employ the fuel cut method. Instead, the control applies the valve timing change and the ignition timing change and employs the ignition cut method only in the range of serious over-revolution. Therefore, the engine speed can be reduced before it achieves a value in the serious range. If the engine speed rapidly increases to within the serious range, it is promptly lowered to a more acceptable level and then brought down gradually. The over-revolution thus is effectively inhibited without generating large fluctuations in the engine speed.

Figure 14:
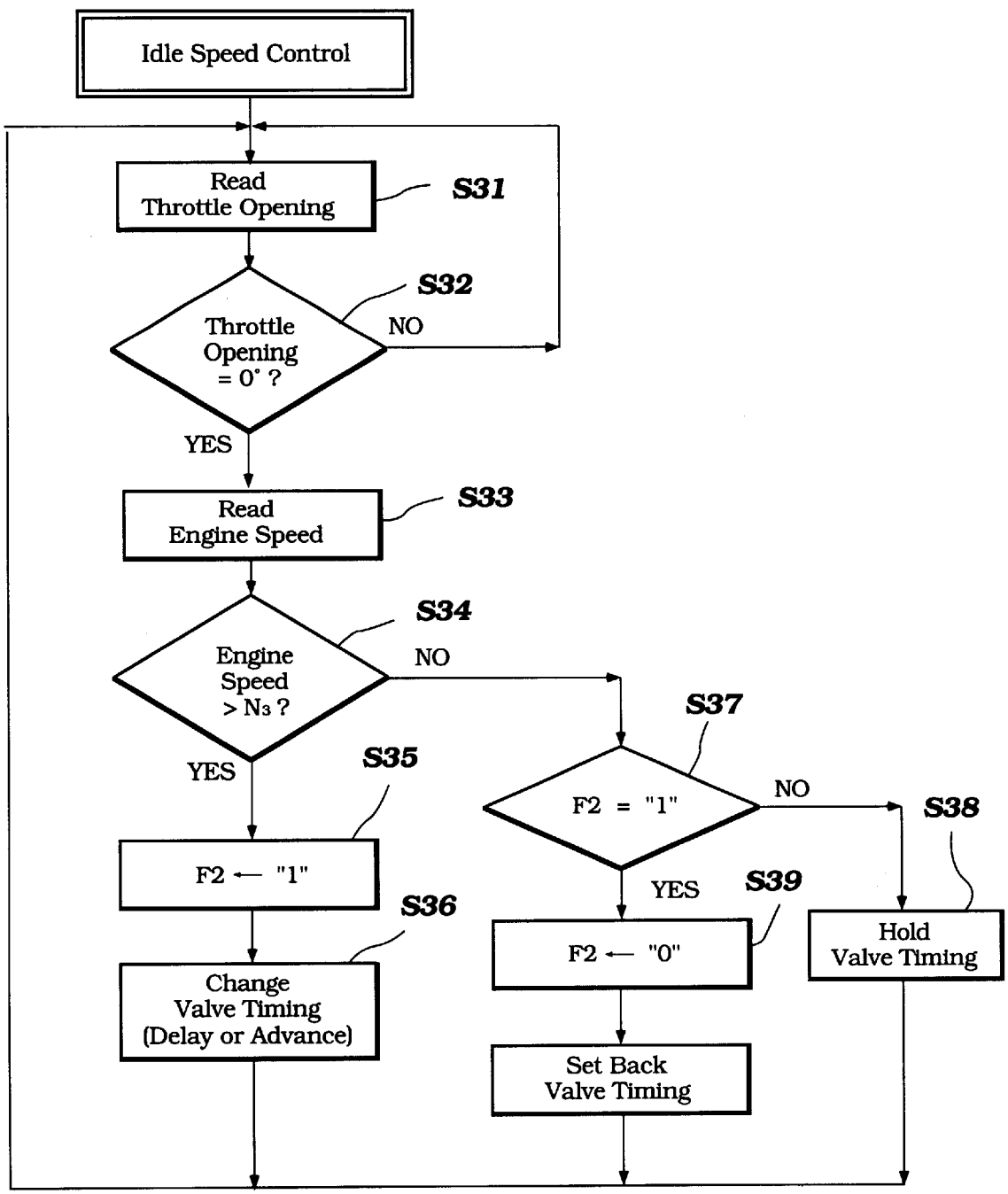
FIG. 14 is an exemplary idle speed control routine that can be practiced by the control system of FIG. 10.

FIG. 14 illustrates a control routine for idle speed control. In this control, the ECU 352 controls the VVT mechanism 240 to adjust the intake camshaft 172 timing, preferably to a certain position closer to the second limit position (i.e., delayed) than the current position, if the throttle valve is generally closed and an engine speed is greater than a preset objective idle speed.

The routine starts and proceeds to the step S31. At the step S31, the ECU 352 reads a signal of the throttle valve position sensor 156 and then goes to the step S32. The routine determines, at the step S32, whether the throttle valve opening degree sensed by the throttle position sensor 156 is zero or not. If this is negative, the routine returns to the step S31 to repeat the step S31 again. If the determination is affirmative, the routine goes to the step S33 to read a signal of the engine speed sensor 354 and then goes to the step S34.

At the step S34, the ECU 352 determines whether the engine speed is greater than the objective idle speed $N_3$ that preferably is about 700 rpm. If this is affirmative, the routine goes to the step S35 and sets an over-idle flag F2 to "1". The routine then goes to the step S36 to control the OCV 316 to set the angular position of the camshaft 172 to a delayed position relative to the present position. The delayed angle preferably is about 8–10 degrees. Under this control, the engine operation slows down to the objective idle speed.

If the determination at the step S34 is negative, the routine goes to the step S37 to determine whether the over-idle flag F2 has been set to "1". If the over-idle flag F2 has not been set, e.g., during the first cycle, the routine goes to the step S38. At the step S38, the ECU 352 commands the OCV 316 to hold the present angular position and then returns back to the step S31. After the over-idle flag has been set, the determination at the step S37 is positive and the routine thus goes to the step S39 to set the over-idle flag F2 to "0". The routine then goes to the step S40 and the ECU 352 commands the OCV 316 to set the angular position back to the initial position. Afterward, the routine returns back to the step S31 to repeat the steps.

Alternatively, the ECU 352 can control the OCV 314 to set the angular position to an advanced position instead of setting to the delayed position at the step S36. The advance degree preferably is about 8–10 degrees. Under this control, the engine operation can also slow down to the objective idle speed.

As thus described, the idle speed control in the illustrated embodiment does not necessarily employ the ignition timing change to hold the idle speed in an appropriate range. Instead, the control applies at least a change in valve timing. The idle speed of the engine thus can be maintained under the objective idle speed without inviting deterioration of fuel economy.

While the two above-routines discussed singular movements, it is anticipated that graduated movements also can be used. In such an arrangement, the movement of the timing can be based upon values contained in a map, such as the first two routines discussed above. Moreover, with respect to the first two routines, the acceleration control can be binary rather than graduated such that the timing is adjusted once and the value to which the timing is adjusted can be variable depending upon the inputs received.

Unless indicated otherwise, it may be assumed that the process steps described herein are implemented within software modules (programs) that are executed by one or more general purpose computers. The software modules may be stored on or within any suitable computer-readable medium. It should be understood that the various steps may alternatively be implemented in-whole or in-part within specially designed hardware. Of course, the foregoing description also is that of preferred constructions and control routines having certain features, aspects and advantages in accordance with the present invention. These routines can be combined, integrated, or adjusted as desired. In addition, various steps of these routines can be altered, reordered, combined or separated as desired. Various other changes and modifications also may be made to the above-described arrangements without departing from the spirit and scope of the invention, as defined by the claims.

What is claimed is:

1. An internal combustion engine for a marine drive comprising an engine body, a member movable relative to the engine body, the engine body and the member together defining a variable-volume combustion chamber, an air induction device being arranged to introduce air to the combustion chamber, the air induction device comprising an intake port that provides a connection between the air induction device and the combustion chamber, an intake valve movable relative to the intake port between an open position and closed position such that the intake valve can selectively inhibit air flow into the combustion chamber, a valve actuator rotatably journaled relative to the engine body, the valve actuator moving the intake valve at a preset angular position of the valve actuator, a valve actuator driving arrangement being adjustably connected to the valve actuator such that the preset angular position can be advanced or delayed through movement relative to the valve actuator driving arrangement, a setting mechanism being interposed between the valve actuator driving arrangement and the valve actuator, the setting mechanism arranged to adjust the preset angular position of the valve actuator relative to the valve actuator driving arrangement, the setting mechanism capable of adjusting the valve actuator between a first limit angular position and a second limit angular position, the first limit angular position being advanced relative to the second limit angular position, a sensor arranged to sense an amount of the air within the induction device, and a control system adapted to control the setting mechanism based upon the signal of the sensor, the control system adapted to control the setting mechanism to set the valve actuator to an adjusted angular position that is advanced relative to a current angular position when the signal indicates that the amount of the air increases and a change rate of the amount is greater than a preset change rate.

2. The internal combustion engine as set forth in claim 1 additionally comprising an output shaft and a second sensor, the output shaft being journaled relative the engine body and being driven for rotation by the member, the second sensor being arranged to sense a rotational speed of the output shaft, the control system controlling the setting mechanism to maintain the valve actuator in the adjusted angular position so long as the signal of the second sensor indicates that the rotational speed of the output shaft is less than a preset speed.

3. The internal combustion engine as set forth in claim 1, wherein the control system controls the setting mechanism to maintain the valve actuator in the adjusted angular position for a preset time period.

4. The internal combustion engine as set forth in claim 1, wherein the air induction device comprises a throttle valve movable between an open position and a closed position to control an air flow, and the sensor comprises a throttle valve position sensor arranged to sense a position of the throttle valve between the open and closed positions.

5. The internal combustion engine as set forth in claim 1, wherein the sensor comprises an intake pressure sensor arranged to sense a pressure in the air induction device.

6. The internal combustion engine as set forth in claim 1 additionally comprising a sensor arranged to sense an engine temperature, the adjusted angular position being at least partially determined on the basis of the sensed engine temperature.

7. The internal combustion engine as set forth in claim 6 additionally comprising a cooling system arranged to cool at least the engine body, wherein the second sensor includes a coolant temperature sensor arranged to sense temperature of the coolant.

8. The internal combustion engine as set forth in claim 1 additionally comprising an output shaft journaled relative to the engine body and rotated by the movable member, a second sensor being arranged to sense a rotational speed of the output shaft, the control system manipulating the setting mechanism to set the valve actuator to the angular position closer to the first angular position only when the signal of the second sensor indicates that the rotational speed of the output shaft is less than a preset speed.

9. The internal combustion engine as set forth in claim 1, wherein the setting mechanism is hydraulically operated.

10. The internal combustion engine as set forth in claim 1, wherein the valve actuator comprises a camshaft.

11. The internal combustion engine as set forth in claim 10, wherein the camshaft is disposed generally vertically, and the setting mechanism is disposed proximate an upper portion of the camshaft.

12. The internal combustion engine as set forth in claim 1 additionally comprising an output shaft journaled relative to the engine body and rotated by the movable member, a second sensor being arranged to sense a rotational speed of the output shaft, the control system manipulating the setting mechanism to set the valve actuator to an angular position that is different from the adjusted angular position when the signal of the second sensor indicates that the rotational speed of the output shaft is greater than a preset speed.

13. The internal combustion engine as set forth in claim 1 additionally comprising an output shaft journaled relative to the engine body and rotated by the movable member, a second sensor being arranged to sense a rotational speed of the output shaft, the air induction device comprising a throttle valve movable between an open position and a closed position to control the amount of the air drawn through the air induction device, the first sensor sensing a position of the throttle valve between the open position and the closed position, the control system controls the setting mechanism to set the valve actuator to an angular position that is different from the present angular position when the signal of the first sensor indicates that throttle valve is generally at the closed position and the signal of the second sensor indicates that the rotational speed of the output shaft is greater than a preset speed.

14. The internal combustion engine as set forth in claim 12, wherein the first preset speed is an objective idle speed.

15. An internal combustion engine for a marine drive comprising an engine body, a movable member movable relative to the engine body, an output shaft rotatably driven by the movable member, the engine body and the movable member together defining a combustion chamber, an air induction device arranged to introduce air to the combustion chamber, the air induction device comprising an intake port communicating with the combustion chamber, an intake valve adapted to selectively open and close the intake port, a valve actuator journaled on the engine body for rotation to actuate the intake valve at a first angular position, a setting mechanism arranged to adjust the valve actuator to an angular position between a first limit angular position and a second limit angular position, the first limit angular position being advanced relative to the second limit angular position, a sensor arranged to sense a rotational speed of the output shaft, and a control system configured to control the setting mechanism based upon the signal of the sensor, the control system controlling the setting mechanism to set the valve actuator to an angular position that is different from a present angular position when the signal of the sensor indicates that the rotational speed of the output shaft is greater than a first preset speed.

16. The internal combustion engine as set forth in claim 15, wherein the control system controls the setting mechanism to set the valve actuator to the angular position that is different from the present angular position only when the rotational speed of the output shaft is less than a second preset speed and is greater than the first preset speed.

17. The internal combustion engine as set forth in claim 16 additionally comprising a fuel supply system arranged to supply fuel to the combustion chamber, and an ignition system arranged to ignite the air/fuel mixture in the combustion chamber, the control system controlling the ignition system to delay ignition when the rotational speed of the output shaft is less than the second preset speed and is greater than the first preset speed.

18. The internal combustion engine as set forth in claim 16 additionally comprising a fuel supply system arranged to supply fuel to the combustion chamber, and an ignition system arranged to ignite the air/fuel mixture in the combustion chamber, the control system controlling the ignition system to interrupt ignition when the rotational speed of the output shaft is greater than a second preset speed which is greater than the first preset speed.

19. The internal combustion engine as set forth in claim 15, wherein the control system controls the setting mechanism to set the valve actuator to an angular position that is closer to the first angular position than the present angular position when the signal of the second sensor indicates that the rotational speed of the output shaft is greater than the first preset speed.

20. The internal combustion engine as set forth in claim 15, wherein the control system controls the setting mechanism to set the valve actuator to an angular position that is closer to the second angular position than the present angular position when the signal of the second sensor indicates that the rotational speed of the output shaft is greater than the first preset speed.

21. The internal combustion engine as set forth in claim 15, wherein the control system controls the setting mechanism to set the valve actuator to an angular position that is different from the present angular position when the signal of the sensor indicates that the rotational speed of the output shaft is greater than a second preset speed and is less than a third preset speed which is less than the first preset speed.

22. An internal combustion engine for a marine drive comprising an engine body, a movable member movable relative to the engine body, an output shaft driven for rotation by the movable member, the engine body and the movable member together defining a combustion chamber, an air induction device arranged to introduce air to the combustion chamber, the air induction device defining an intake port into the combustion chamber, the air induction device comprising a throttle valve movable between an open position and a closed position to measure a flow of air, an intake valve movable to open and close the intake port, a valve actuator journaled on the engine body for rotation to actuate the intake valve, a setting mechanism arranged to set the valve actuator to an angular position between first and second angular positions, the first angular position being advanced relative to the second angular position, a first sensor arranged to sense a rotational speed of the output shaft and a second sensor arranged to sense a position of the throttle valve between the open and closed positions, a control system configured to control the setting mechanism based upon the respective signals of the first and second sensors, the control system controlling the setting mechanism to set the valve actuator to an angular position that is different from a present angular position when the signal of the second sensor indicates that the throttle valve is generally at the closed position and the signal of the first sensor indicates that the rotational speed of the output shaft is greater than a preset speed.

23. The internal combustion engine as set forth in claim 22, wherein the preset speed is an objective idle speed.

24. The internal combustion engine as set forth in claim 22 additionally comprising an idle air delivery device arranged to bypass the throttle valve, wherein the idle air delivery device includes an idle valve arranged to measure an amount of idle air passing through the idle air delivery device.

25. The internal combustion engine as set forth in claim 22, wherein the control system controls the setting mechanism to set the valve actuator to an angular position that is closer to the second angular position than the present angular position when the signal of the second sensor indicates that the throttle valve is generally in the closed position and the signal of the first sensor indicates that the rotational speed of the output shaft is greater than the preset speed.

26. The internal combustion engine as set forth in claim 22, wherein the control system controls the setting mechanism to set the valve actuator to an angular position that is closer to the first angular position than the present angular position when the signal of the second sensor indicates that the throttle valve is generally in the closed position and the signal of the first sensor indicates that the rotational speed of the output shaft is greater than the preset speed.

27. An internal combustion engine for a marine drive comprising an engine body, a movable member movable relative to the engine body, the engine body and the movable member together defining a combustion chamber, an air induction device arranged to introduce air to the combustion chamber, the air induction device defining an intake port next to the combustion chamber, an intake valve movable between open and closed positions of the intake port, a valve actuator journaled on the engine body for rotation to actuate the intake valve at a set angular position, a setting mechanism arranged to set the valve actuator to an angular position between first and second angular positions, the first angular position being advanced relative to the second angular position, and means for controlling the setting mechanism, the means controlling the setting mechanism to set the valve actuator to an angular position that is closer to the first angular position than a present angular position when an operation of the engine is accelerated under a condition that an engine speed of the engine is less than a preset speed.

28. A method for controlling an internal combustion engine having an intake valve arranged to admit air to a combustion chamber when opened, a valve actuator arranged to actuate the intake valve at a set angular position, a setting mechanism arranged to set the valve actuator at least between first and second angular positions, the first angular position being advanced relative to the second position, at least one sensor and a control device, the method comprising determining whether the engine is under an acceleration condition based upon a signal of the sensor, and controlling the setting mechanism to advance the valve actuator to an angular position that is closer to the first angular position than a present angular position by the control device when the acceleration condition is determined.

29. The method as set forth in claim 28 additionally comprising determining whether an engine speed is less than a preset speed and holding the valve actuator in the angular position closer to the first angular position as long as the engine speed is less than the preset speed.

30. The method as set forth in claim 28 additionally comprising holding the valve actuator in the angular position closer to the first angular position for a preset time.

31. A method for controlling an internal combustion engine having an intake valve arranged to admit air to a combustion chamber when opened, a valve actuator arranged to actuate the intake valve at a set angular position, a setting mechanism arranged to set the valve actuator to an angular position between a first angular position and a second angular position, the first angular position being advanced relative the second position, at least one sensor, and a control device, the method comprising determining whether an engine speed is greater than a preset speed and controlling the setting mechanism to set the valve actuator to an angular position that is different from a present angular position when the engine speed is greater than the preset speed.

32. The method as set forth in claim 31 additionally comprising determining whether the engine speed is less than a second preset speed and controlling the setting mechanism to set the valve actuator to the angular position that is different from the present angular position only if the engine speed is greater than the preset speed and less than the second preset speed.

33. The method as set forth in claim 32, wherein the engine further has an ignition system, the method additionally comprising delaying ignition by the ignition system when the engine speed is greater than the preset speed and less than the second preset speed.

34. The method as set forth in claim 32, wherein the engine further has an ignition system, the method additionally comprising interrupting ignition by the ignition system if the engine speed is greater than the second preset speed.

35. The method as set forth in claim 31, wherein the valve actuator is advanced in the step of controlling the setting mechanism.

36. A method for controlling an internal combustion engine having a throttle valve arranged to measure an amount of air, an intake valve arranged to admit the air to a combustion chamber when opened, a valve actuator arranged to actuate the intake valve at a set angular position, a setting mechanism arranged to set the valve actuator to an angular position between a first angular position and a second angular position, the first angular position being advanced relative to the second position, at least one sensor and a control device, the method comprising determining whether the throttle valve is generally in a closed position, determining whether an engine speed is greater than a preset speed, and controlling the setting mechanism to set the valve actuator to an angular position that is different from a present angular position when the throttle valve is generally closed and the engine speed is greater than the preset speed.

37. The method as set forth in claim 36, wherein the preset speed is an objective idle speed.

38. The method as set forth in claim 36, wherein the valve actuator is set to an angular position that is closer to the second angular position than the present angular position in the step of controlling the setting mechanism.

* * * * *